United States Patent
Fujita et al.

(10) Patent No.: US 8,134,604 B2
(45) Date of Patent: Mar. 13, 2012

(54) CAMERA SHAKE CORRECTION DEVICE, CAMERA SHAKE CORRECTION METHOD AND IMAGING DEVICE

(75) Inventors: Hideto Fujita, Yao (JP); Haruo Hatanaka, Kyoto (JP); Hiroaki Yoshida, Takatsuki (JP); Akihiko Yamada, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 692 days.

(21) Appl. No.: 11/938,401

(22) Filed: Nov. 12, 2007

(65) Prior Publication Data

US 2008/0111889 A1    May 15, 2008

(30) Foreign Application Priority Data

Nov. 13, 2006   (JP) ................. 2006-306409

(51) Int. Cl.
H04N 5/228        (2006.01)
(52) U.S. Cl. ................................... 348/208.6
(58) Field of Classification Search ............... 348/208.3, 348/208.14, 204.6, 208.4, 208.6; 382/118
See application file for complete search history.

(56) References Cited

U.S. PATENT DOCUMENTS

| | | | | |
|---|---|---|---|---|
| 5,107,293 A | * | 4/1992 | Sekine et al. | 396/55 |
| 5,237,405 A | * | 8/1993 | Egusa et al. | 348/208.1 |
| 5,648,815 A | * | 7/1997 | Toba | 348/207.99 |
| 6,982,746 B1 | * | 1/2006 | Kawahara | 348/208.99 |
| 7,502,050 B2 | * | 3/2009 | Hatanaka et al. | 348/208.3 |
| 2006/0216010 A1 | * | 9/2006 | Yamanouchi et al. | 396/55 |
| 2008/0186386 A1 | * | 8/2008 | Okada et al. | 348/208.4 |

FOREIGN PATENT DOCUMENTS

| | | |
|---|---|---|
| JP | 10-307923 | 11/1998 |
| JP | 2000-105819 | 4/2000 |
| JP | 2002-099013 | 4/2002 |
| JP | 2003-323621 | 11/2003 |
| JP | 2006-072770 | 3/2006 |
| JP | 2006-101485 | 4/2006 |
| JP | 2006-211139 | 8/2006 |

* cited by examiner

*Primary Examiner* — Jason Chan
*Assistant Examiner* — Gary C Vieaux
(74) *Attorney, Agent, or Firm* — Marvin A. Motsenbocker; Mots Law, PLLC

(57) ABSTRACT

Movement of an imaging device is detected using a camera shake detection sensor or a motion vector obtained from an image signal, and camera shake correction is performed by shifting an extraction frame (valid photographing region) within a photographable maximum region based on the motion detection result. When movement of the imaging device is causing a face region located at the edge of the extraction frame to move towards out of the frame, it is determined that the movement is due to camera shake, and the extraction frame is moved so that the face region can stay within the frame. Meanwhile, when movement of the imaging device is causing the face region to move inward within the frame, it is determined that the movement is due to a pan or tilt operation, and position control is performed so that the deliberate movement is not inhibited.

10 Claims, 15 Drawing Sheets nth FRAME

FIG. 18
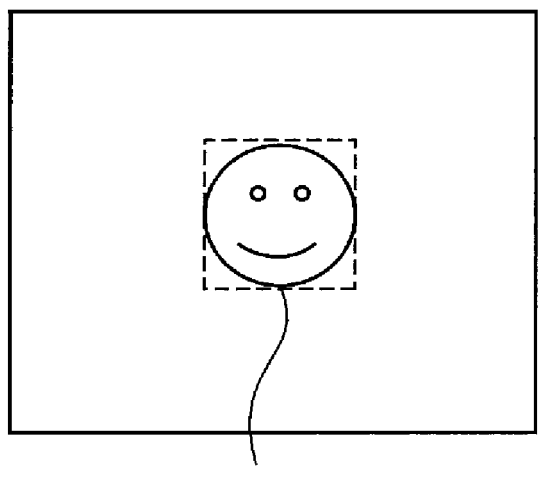
(n-1)th FRAME
120
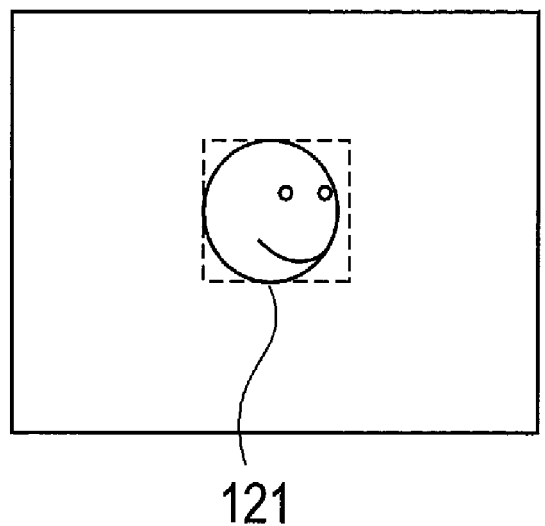
nth FRAME
121

CAMERA SHAKE CORRECTION DEVICE, CAMERA SHAKE CORRECTION METHOD AND IMAGING DEVICE

CROSS REFERENCE TO RELATED APPLICATIONS

This application claims priority based on 35 USC 119 from prior Japanese Patent Application No. P2006-306409 filed on Nov. 13, 2006, the entire contents of which are incorporated herein by reference.

BACKGROUND OF THE INVENTION

1. Field of the Invention

The present invention relates to a camera shake correction device, a camera shake correction method, and an imaging device, such as a digital video camera or digital still camera, provided with the camera shake correction device.

2. Description of Related Art

A camera shake correction technique is for reducing camera shake caused during photographic operation, and has been actively studied in recent years. In the camera shake correction technique, it is important to discriminate between camera shake and deliberate camera movement caused by a photographer (camera operator). Such deliberate camera movement is caused by movements of hands performing a camera operation, such as pan and tilt operations. Although a standard imaging device is provided with a function for discriminating between camera shake and deliberate camera movement, it is difficult in general to perfectly discriminate therebetween.

If the imaging device provided with a display unit erroneously identifies deliberate camera movement as camera shake, a displayed image may become unnatural. For example, suppose that a photographer moves the imaging device to the left direction for changing picture composition, and the imaging device determines the movement as camera shake. In this case, shake of a displayed image that should be caused by the camera operation is cancelled, resulting in an unnatural displayed image. Specifically, the displayed image responds to the camera operation with a time lag.

In an imaging device, motion detection is performed according to image information, and camera shake correction is executed based on the motion detection result. If any movement different from camera shake is present within the image, reliability of the motion detection is decreased. Consequently, optimal camera shake correction becomes impossible. This is because the imaging device performs camera shake correction upon identifying any movement of a photographic subject different from camera shake as a component of camera shake.

It is urgent that problems of camera shake correction, such as one described above, should be solved. Specifically, the kind of problems to be solved derives from failure in discrimination between camera shake and deliberate camera movement, or from the presence of any movement different from camera shake.

SUMMARY OF THE INVENTION

The invention provides a camera shake correction device and a camera shake correction method which both can contribute to achievement of further appropriate camera shake correction. The invention provides an imaging device provided with the camera shake correction device.

One aspect of the invention provides a camera shake correction device including: a detection unit which detects movement of an imaging device and outputs motion data of the movement; an object-region extraction unit which extracts a target object region from a photographed image photographed by an imaging unit of the imaging device and outputs position data of the extracted object region by each frame of the captured image; and a correction unit which performs camera shake correction of the photographed image based on the position data of the object region and the motion data.

For example, when a target object region is shifting towards out of a frame, it is likely that movement of the imaging device causing such a shift of the photographic subject is camera shake to be corrected. On the other hand, when a target object region is shifting towards the center of a frame, it is likely that movement of the imaging device causing such a shift of the object region is deliberate camera movement by a photographer. Thus, it is possible to obtain information for performing natural camera shake correction by examining the direction of a shift of a target object region. Based on such observations, the camera shake correction device is configured as described above. With the camera shake correction device, more appropriate camera shake correction (natural camera shake correction) can be performed.

By referring to the direction of movement of a target object region and the movement, represented by motion data, of the imaging device, it is possible to estimate whether the movement is caused by deliberate camera movement or camera shake.

BRIEF DESCRIPTION OF THE DRAWINGS

FIG. 18 is a view showing a change in the direction of a face between frame images next to each other according to the third embodiment.

DETAILED DESCRIPTION OF THE EMBODIMENTS

Figure 1:
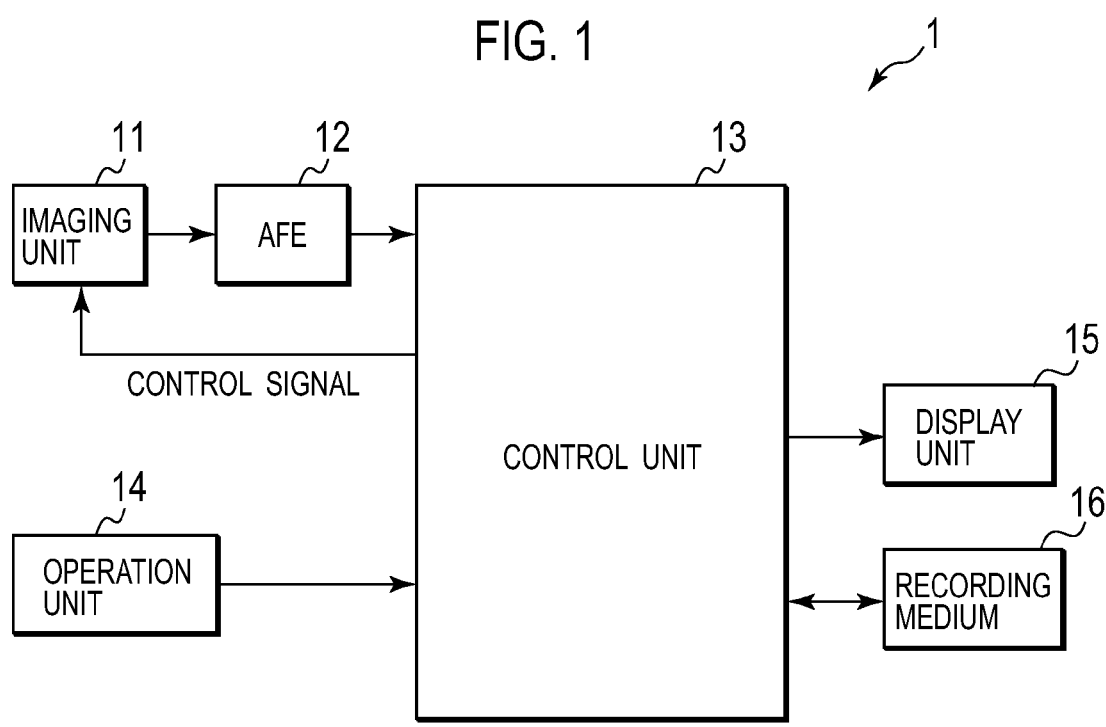
FIG. 1 is an overall block diagram of an imaging device according to embodiments of the invention.

Embodiments of the invention are specifically described below with reference to the drawings. Regarding the respective figures to be referenced, the same component among figures is given the same reference numeral, and redundant explanation thereof is omitted in principle. At first, common matters among the embodiments and references in each of the embodiments will be described, followed by description of the first to fourth embodiments.

FIG. 1 is a general block diagram of imaging device 1 according to embodiments. Imaging device 1 is a digital video camera capable of capturing dynamic and/or still images. Image device 1 may be a digital still camera capable of capturing only a still image.

Imaging device 1 includes imaging unit 11, AFE (Analog Front End) 12, controller 13, operation unit 14, display unit 15 and recording medium 16. Imaging unit 11 has an optical system, an aperture, an imaging device that includes image sensors, such as CCD (Charge Coupled Devices) and CMOS (Complementary Metal Oxide Semiconductor) image sensors, and a driver for controlling the optical system and the aperture (all are not shown in the drawing). Based on a control signal from the controller 13, the driver controls zoom magnification and focal length of the optical system, and degree of aperture. The imaging device performs photoelectric conversion of an optical image of a photographic subject incoming through the optical system and the aperture, and outputs an electric signal obtained by the photoelectric conversion to AFE 12.

AFE 12 amplifies an analog signal output from imaging unit 11 (imaging device), and converts the amplified analog signal to a digital signal. AFE 12 sequentially outputs the digital signal to controller 13.

Controller 13 includes multiple components, such as a CPU (Central Processing Unit), a ROM (Read Only Memory), and a RAM (Random Access Memory), and also functions as an image signal processing unit. Based on the output signal of AFE 12, controller 13 generates an image signal representing an image (hereinafter also referred to as "photographed image") captured by imaging unit 11.

Operation unit 14, which is composed of multiple components, such as a shutter button and arrow keys (both are not shown), receives an external operations. The content of an operation received by operation unit 14 is transmitted to controller 13. Display unit 15 is a display device which is composed of multiple components, such as a liquid crystal display panel, and displays images, such as an image based on the current photographed image and one stored in recording medium 16, under the control of controller 13. Recording medium 16, which is a nonvolatile memory, such as a SD (Secure Digital) memory card, stores images, such as an image based on the photographed image, under the control of controller 13.

Operation modes of imaging device 1 include a shooting mode with which each of photographed animated and still images can be stored in recording medium 16 according to an operation received by operation unit 14, and a replay mode with which an image recorded on recording medium 16 can be replayed and displayed on display unit 15. A transition between these modes can be done with predetermined operations in operation unit 14.

In the shooting mode, imaging unit 11 sequentially performs photographing with a predetermined frame period (for example, with a period of 1/60 sec), and each of the images sequentially photographed is updated and displayed on display unit 15. What is actually displayed on display unit 15 is an extracted image (or its reduced image) obtained by camera shake correction. Additionally, with the shooting mode, the extracted image is recorded on recording medium 16 according to an operation received by operation unit 14.

Figure 2:
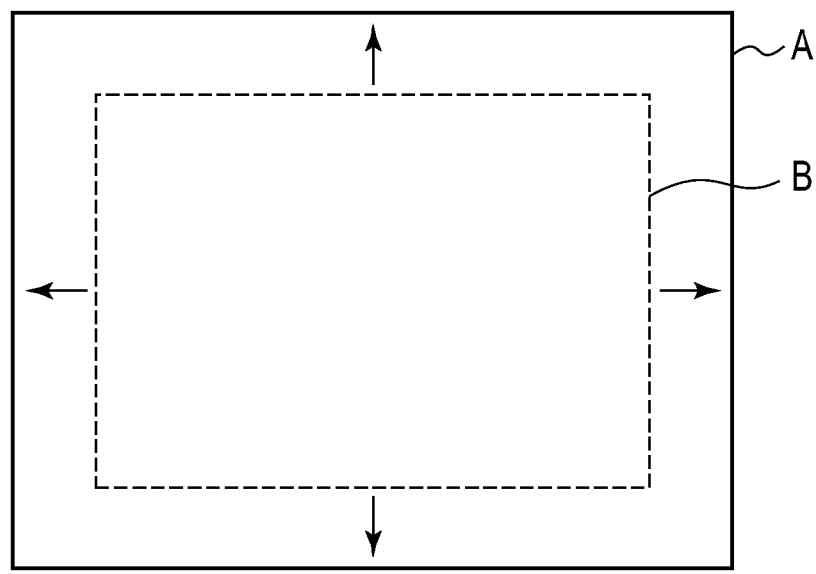
FIG. 2 is a view showing a relationship between the entire region of a photographed image and an extracted frame.

A relationship between the photographed image and the extracted image will be explained by referring to FIG. 2. In FIG. 2, square frame A represents the entire region of the photographed image, and square frame B represents an extraction frame formed in the entire region of the photographed image. An image within extraction frame B is adopted as an extracted image. In camera shake correction, extraction frame B is two-dimensionally moved within the entire region A of the photographed image so that blurring of the extracted image caused by movement of imaging device 1 can be cancelled out.

Since entire region A of the photographed image is the maximum photographable region, it can be referred to as the maximum photographable region. On the other hand, the region within extraction frame B is the image region which is actually displayed on display unit 15 and is actually recorded on recording medium 16, and therefore can be referred to as a valid photographed region, and an image within the valid imaging region is called a valid photographed image.

The following will explain the first to fourth embodiments as specific examples of camera shake correction achieved by use of imaging device 1. Any content described in any of the embodiments can be applied to other embodiments unless a contradiction arises. The camera shake correction unit shown in the respective embodiments is provided in controller 13 shown in FIG. 1.

Suppose, every time after the predetermined frame cycle has lapsed, first, second, . . . (n−1)-th, (n+1)-th frames appear in this order. A single image is captured for each frame. Photographed images captured by photographing first, second, . . . (n−1)-th, n-th, and (n+1)-th frames are hereafter referred to as first, second, . . . (n−1)-th, n-th, and (n+1)-th frame images (n is an integer of two or more), respectively. In the present specification, the photographed image and the frame image are regarded as equivalents. A dynamic image is formed by multiple frame images sequentially obtained.

First Embodiment

Figure 3:
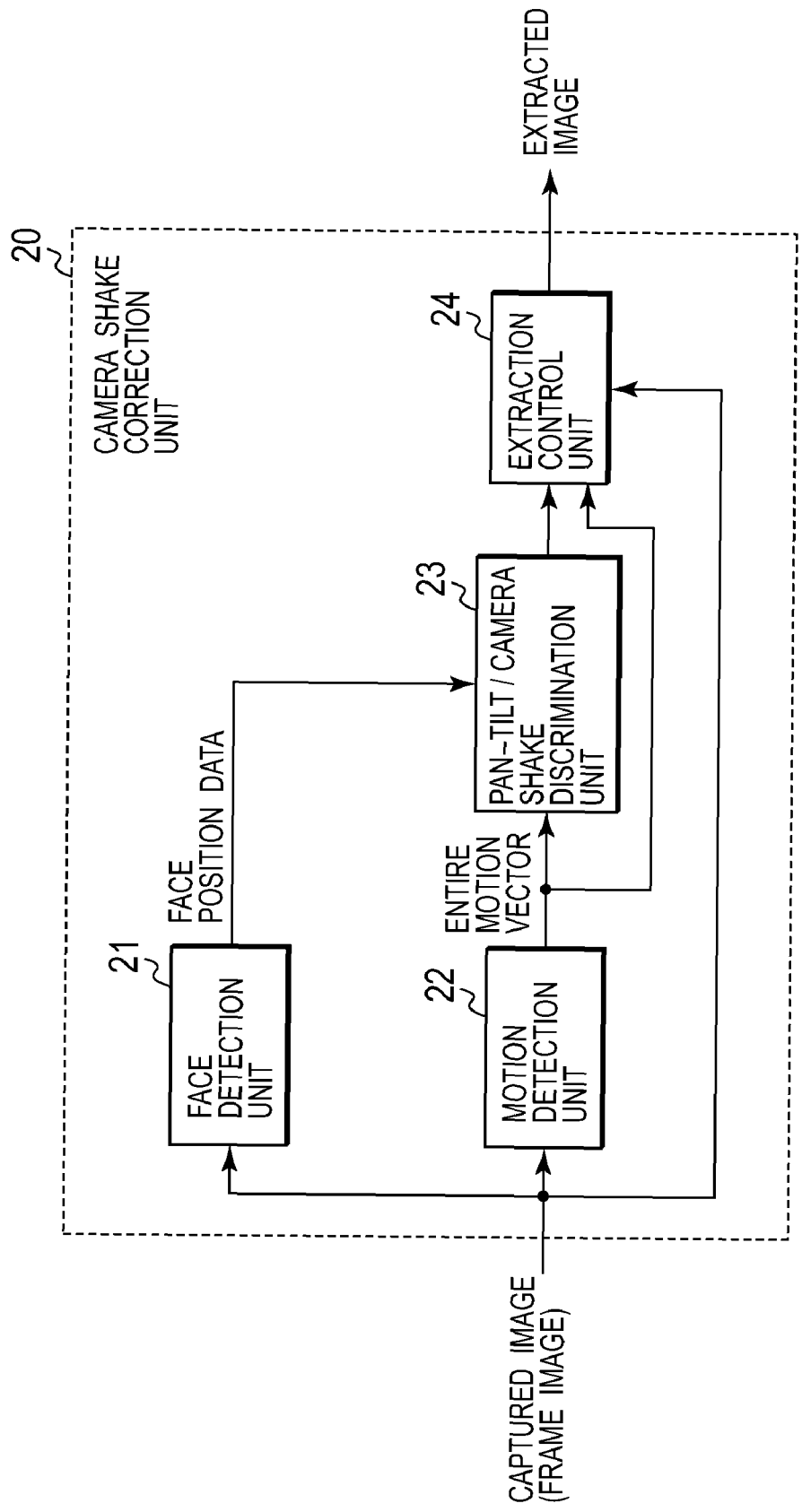
FIG. 3 is a functional block diagram of a camera shake correction unit provided in a controller shown in FIG. 1 according to a first embodiment.

First, a first embodiment will be explained. FIG. 3 is a functional block diagram of camera shake correction unit 20 which performs camera shake correction according to the first embodiment. Camera shake correction unit 20 has face detection unit 21, motion detection unit 22, pan-tilt/camera shake discrimination unit (hereinafter referred to as discrimination unit 23), and extraction controller 24.

An image signal representing a photographed image (frame image) for each frame is provided to camera shake correction unit 20. Camera shake correction unit 20 outputs an extracted image which is obtained by extraction of a part of the photographed image.

Face detection unit 21 detects a human face from each of the photographed images, and extracts a face region including the entire or a part of the face. Various methods are available for detecting a face within an image, and face detection unit 21 may adopt any of such methods. For example, a face (face region) may be detected by extracting a skin color region from a photographed image as in the method described in Japanese Patent Application Laid-Open Publication No. 2000-105819, and a face (face region) may be detected as in the method described in Japanese Patent Application Laid-Open Publication Nos. 2006-211139 and 2006-72770.

Typically, for example, degree of similarity between an image of a target region set in an input image (namely, photographed image) and a reference face image having a predetermined image size is determined, and, based on the degree of similarity, it is detected whether or not a face is included in the target region (whether or not the target region is the face region). Similarity is determined by extracting feature quantity effective in discriminating whether an object in an image is a face or not. The feature quantity includes multiple components, such as a horizontal edge, a vertical edge, a diagonally rightward edge, and a diagonally leftward edge.

The target region in the input image is shifted in the horizontal direction or in the vertical direction by pixel. Degree of similarity between the image of the shifted target region and the reference face image is determined, and detection is performed in the similar manner. In this manner, the target region is updated and set while being shifted by pixel from the upper left to the lower right of the input image, for example.

Moreover, the input image (namely, photographed image) is reduced at a fixed rate, and the similar face detection processing is performed on the reduced image. By repeating such processing, it is possible to detect a face of any size from the input image.

Face detection unit 21 outputs face position data of the extracted face region to discrimination unit 23. The face position data represents a position of the extracted face region in the photographed image (namely, coordinate position on the image). The face position data is created for each frame and sent to discrimination unit 23. When multiple face regions are extracted from a single photographed image, face position data is created for each of the multiple face regions.

Next, a function of motion detection unit 22 will be explained. Motion detection unit 22 recognizes each of the photographed images upon divided it into M pieces in the vertical direction and N pieces in the horizontal direction. Therefore, each of the photographed images is recognized upon being divided into (M×N) pieces of divided regions. Each of M and N is an integer of two or more. M and N may or may not coincide with each other.

Figures 4, 5:
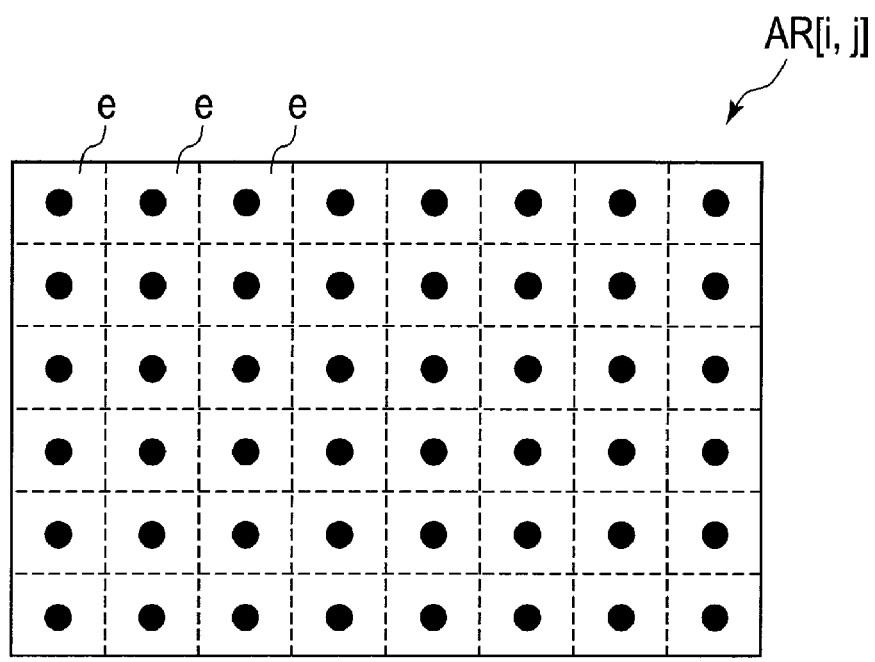
FIG. 4 is a view showing divided regions for motion vector detection which are defined by a motion detection unit 22 in FIG. 3.
FIG. 5 is a view showing the single divided region shown in FIG. 4 is divided into multiple small regions.

FIG. 4 shows divisions of each photographed image. The (M×N) pieces of divided regions are recognized as a matrix of M rows and N columns, and each of the divided regions is expressed as AR [i, j] with the origin X of the photographed image as a reference. Here, i and j are integers that satisfy the conditions, $1 \leq i \leq M$ and $1 \leq j \leq N$, respectively. Each of the divided regions AR [i, j] with the same value of i is composed of each of the pixels located on the same horizontal line, and each of the divided regions AR [i, j] with the same value of j is composed of each of the pixels located on the same vertical line.

Motion detection unit 22 compares image signals between frame images next to each other by using, for example, any publicly-known or well-known image matching method (such as a block matching method and a representative point matching method), and thereby detects a motion vector of each of the photographed image for each of the divided regions AR [i, j]. The motion vector detected for each of the divided region AR [i, j] is particularly referred to as a region motion vector. The region motion vector of a certain single divided region AR [i, j] specifies the size and direction of the movement of the image within the corresponding divided region AR [i, j] between the frame images next to each other.

As an example, a means to calculate the region motion vector between (n−1)-th frame image and n-th frame image for a certain single divided region AR [i, j] using a representative point matching method will be described.

Figure 6:
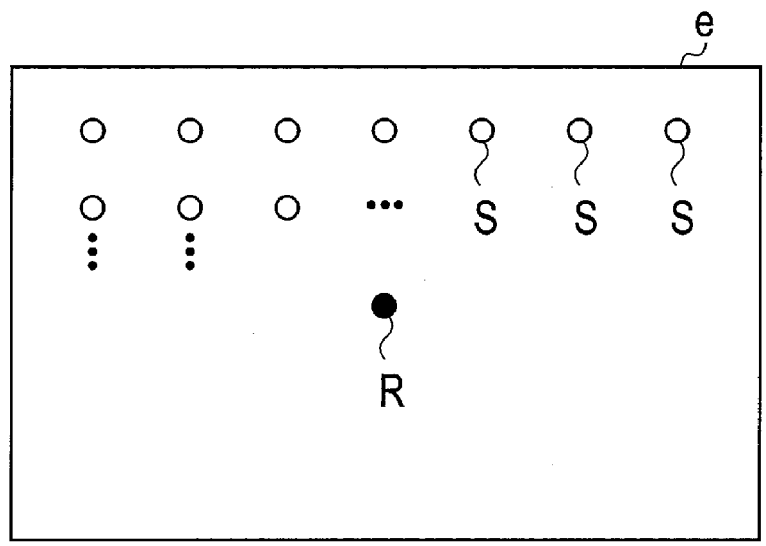
FIG. 6 is a detailed view of the single small region shown in FIG. 5.

As shown in FIG. 5, a single divided region AR [i, j] is divided into multiple small regions (detection blocks) e. In the example shown in FIG. 5, each of the divided region AR [i, j] is divided into 48 small regions e (divided into six in the vertical direction and into eight in the horizontal direction). Each of the small regions e is composed of, for example, 32×32 pixels (two-dimensionally arrayed pixels in 32 columns and 32 rows). Then, as shown in FIG. 6, multiple sampling points S and one representative point R are set for each of the small regions e. Multiple sampling points S correspond to, for example, each one of the pixels which constitutes the small region e (note that the representative point R is excluded).

An absolute value of a difference between a luminance value of each of the sampling points S in a small region e in the n-th frame image and a luminance value of the representative point R in the corresponding small region e in the (n−1)-th frame image is obtained for each of all small regions e. The absolute value obtained for a certain single sampling point S is called a correlation value of the sampling point S. Moreover, the luminance value is a value of a luminance signal that forms an image signal.

Then, among all small regions e within a single detection region, correlation values of sampling points S each having the same shift relative to the representative point R are accumulated (in this example, 48 correlation values are accumulated). In other words, absolute values of a difference in luminance values obtained for a pixel located at the same position in each small region e (same position in the coordinates in the small region) for 48 small regions are accumulated. A value obtained by this accumulation is called "accumulated correlation value." The accumulated correlation value is also called a matching error in general. The number of the accumulated correlation values to be obtained should be the same as the number of the sampling points S within a single small region.

Then, a shift between the representative point R and the sampling point S with the minimum accumulated correlation value, in other words, a shift with the highest correlation, is detected. In general, such a shift is extracted as a region motion vector of the divided region.

Furthermore, motion detection unit 22 determines whether each of the divided regions AR [i, j] is valid or invalid in consideration of reliability of the region motion vector calculated for each of the divided region AR [i, j]. Various different methods are also proposed, and motion detection unit 22 can adopt any of such methods. For example, the method described in Japanese Patent Application Laid-Open Publication No. 2006-101485 may be adopted.

An example of a method for determining whether a certain single divided region AR [i, j] is valid or invalid will be explained. In the case of calculating the region motion vector of a target divided region by using the representative point matching method as described above, multiple accumulated correlation values can be obtained for the target divided region. Motion detection unit 22 determines whether or not the multiple accumulated correlation values satisfy a first condition, "an average value of multiple accumulated correlation values is greater than a predetermined value." Motion detection unit 22 also determines whether or not the multiple accumulated correlation values satisfy a second condition, "a value obtained by dividing an average value of multiple accumulated correlation values by the minimum correlation value is greater than a predetermined value." The minimum correlation value is the minimum value among the multiple accumulated correlation values. Then, when both the first and second conditions are satisfied, the divided region is determined to be valid, and, when the conditions are not satisfied, the relevant divided region is determined to be invalid. The above-described processing is to be performed for each divided region.

Then, motion detection unit 22 acquires an average vector of the region motion vectors calculated for the valid divided regions AR [i, j], and outputs the average vector as an entire motion vector (blurring vector). When a photographic subject which fits within the captured image is motionless, the entire motion vector represents the direction and size of movement of imaging device 1 between frames next to each other.

Discrimination unit 23 discriminates whether the movement of imaging device 1 between frames next to each other is deliberate camera movement or camera shake based on face position data from face detection unit 21 and the entire motion vector from motion vector detection unit 22. Incidentally, when the size of the entire motion vector is zero (or substantially zero), discrimination unit 23 determines that imaging device 1 is in a static state. When it is determined that the imaging device 1 is in a static state, camera shake correction will not be performed.

Deliberate camera movement may be caused by a photographer intentionally moving imaging device 1 in the horizontal direction, so-called pan operation, or in the vertical direction, so-called tilt operation. Camera shake indicates blurring of imaging device 1 which is caused unintentionally due to any event which is not an intention of a photographer, such as tremor of a hand holding imaging device 1.

Figure 7:
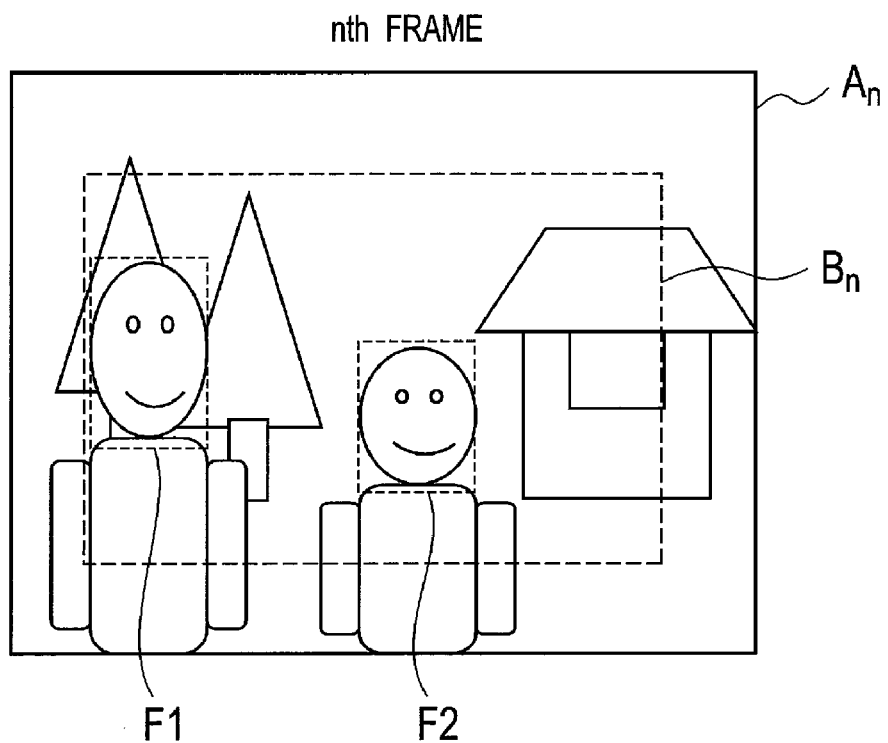
FIG. 7 is a view showing an n-th frame image according to the first embodiment.

The function of discrimination unit 23 will be explained further in detail, first by referring to FIG. 7. It should be noted that each of the respective drawings, including FIG. 7, showing images is illustrated as an image which is observed from the position of imaging device 1 directed to a photographic subject. In FIG. 7, a symbol $A_n$ represents the entire region of an n-th frame image, and a symbol $B_n$ represents an extraction frame of the n-th frame image. Suppose that face detection unit 21 has extracted two face regions F1 and F2 from the n-th frame.

Face position data of each of face regions F1 and F2 is transmitted to discrimination unit 23. Discrimination unit 23 specifies a face region located at the edge of extraction frame $B_n$ according to each of the face position data.

Figure 8:
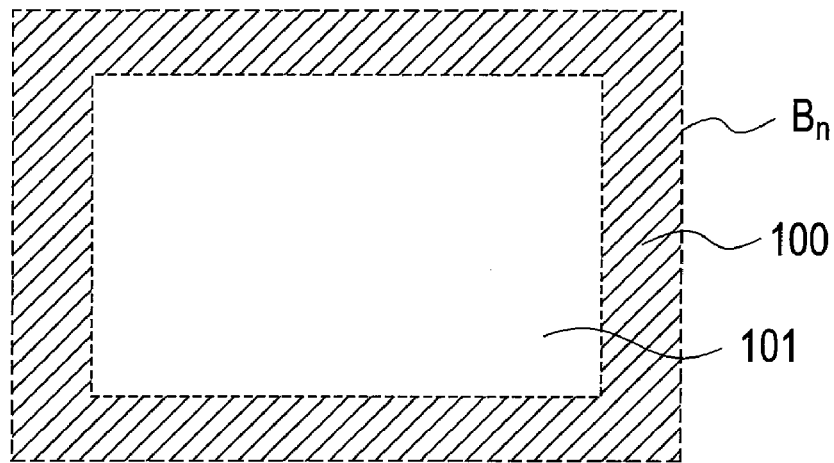
FIG. 8 is a view for explaining a function of the camera shake correction unit shown in FIG. 3.
Figure 9:
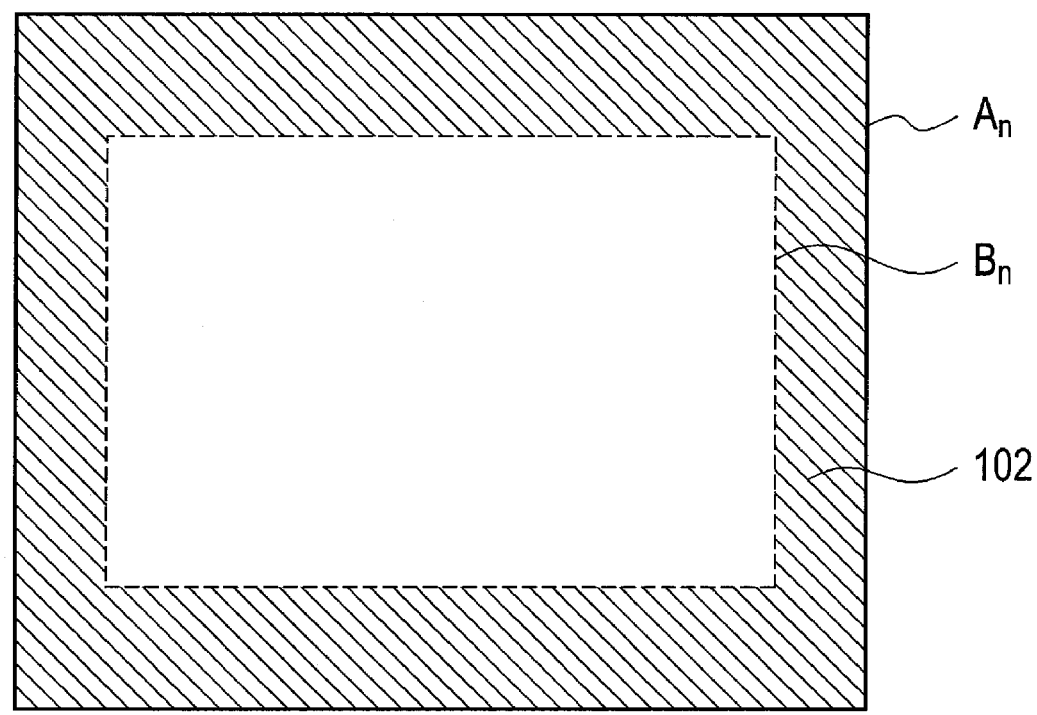
FIG. 9 is a view for explaining a function of the camera shake correction unit shown in FIG. 3.

Specifically, as shown in FIG. 8, an edge region 100 corresponding to an outer peripheral portion of extraction frame $B_n$ within extraction frame $B_n$ is defined. In FIG. 8, edge region 100 is a doughnut-shaped diagonally-striped region. Edge region 100 corresponds to a region obtained by removing a rectangular region 101, which is smaller than extraction frame $B_n$, from the entire region of rectangular extraction frame $B_n$. Incidentally, edge region 100 may include the whole or a part of a region included in the n-th frame and not included in extraction frame $B_n$, that is, the doughnut-shaped diagonally-striped region (see FIG. 9) obtained by removing the region within extraction frame $B_n$ from entire region $A_n$ of the n-th frame image.

Then, based on each face position data, discrimination unit 23 determines any face region which entirely or partly overlaps with edge region 100 as a target object, and any other face region as a non-target object. Particularly, a face region determined as a target object will be occasionally referred to as a target face region hereinafter. Suppose that face region F1 overlapping with edge region 100 and face region F2 not overlapping with edge region 100 have been specified as a target face region and a non-target object, respectively. In the case shown in FIG. 7, suppose that the left edge of target face region F1 matches the left edge of extraction frame $B_n$. It may also be assumed that the left edge of target face region F1 is located further to the left of the left edge of extraction frame $B_n$, and that the right edge of target face region F1 is located further to the right of the left edge of extraction frame $B_n$. The following processing can also be performed under these assumptions.

Figure 10A:
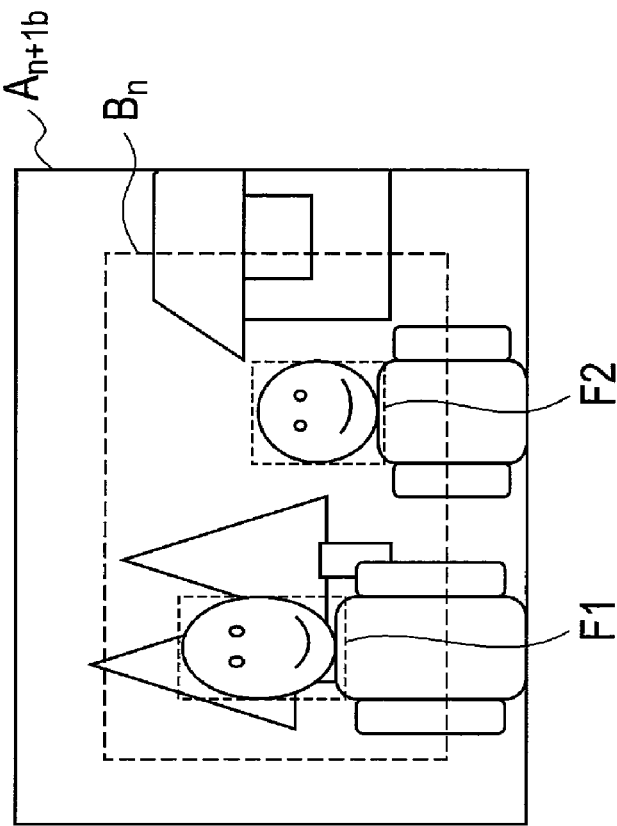
FIG. 10 is a view showing an (n+1)-th frame image before movement control of an extracted frame according to the first embodiment.
Figure 10B:
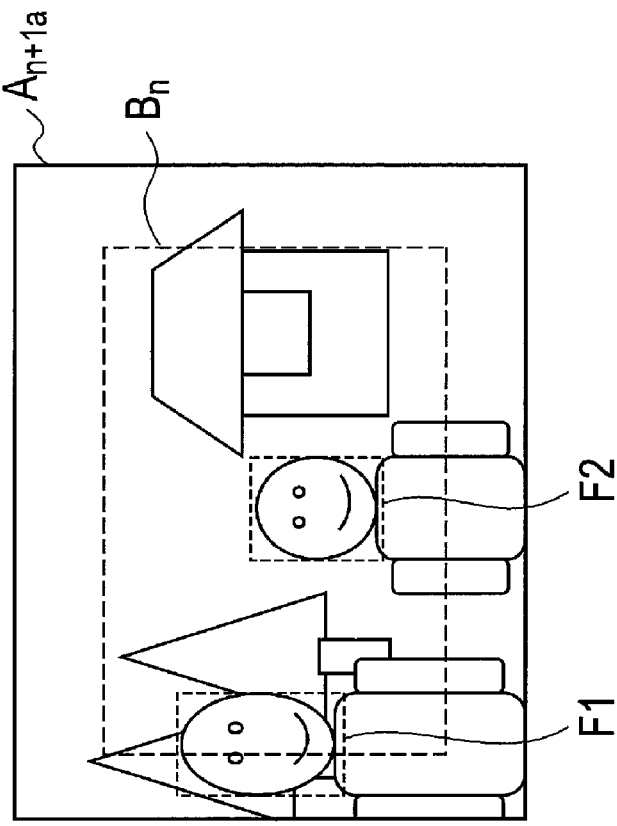

FIG. 10A shows a first example of the (n+1)-th frame image. FIG. 10B shows a second example of the (n+1)-th frame image. A symbol $A_{n+1a}$ in FIG. 10A represents a first example of the entire region of the (n+1)-th frame image, and a symbol $A_{n+1b}$ in FIG. 10B represents a second example of the entire region of the (n+1)-th frame image. Each of FIGS. 10A and 10B shows a superimposing image of extraction frame $B_n$ within the n-th frame image on the (n+1)-th frame image. In each frame, since the position of the extraction frame is move-controlled by extraction controller 24, each of FIGS. 10A and 10B shows a state before movement control of the extraction frame.

In order to simplify the explanation, suppose that all photographic subjects, including faces in face regions F1 and F2, are motionless in the real space between the n-th and (n+1)-th frames.

The (n+1)-th frame image shown in FIG. 10A is obtained by rotating imaging device 1 in the right direction around the vertical line as an axis of rotation between, for example, the n-th and (n+1)-th frames. Due to the rotation, the photographic subjects including face regions F1 and F2 are shifted to the left in the image between the n-th and (n+1)-th frames, and therefore the left side portion of face region F1 is moved to outside of extraction frame $B_n$. In this case, the entire motion vector between the n-th and (n+1)-th frame images is directed to the "right." The entire motion vector between the n-th and (n+1)-th frame images is hereinafter indicated by $V_{n+1}$.

On the other hand, the (n+1)-th frame image shown in FIG. 10B is obtained by rotating imaging device 1 in the left direction around the vertical line as an axis of rotation between, for example, the n-th and (n+1)-th frames. Due to the rotation, the photographic subjects including face regions F1 and F2 are shifted to the right direction in the image between the n-th and (n+1)-th frames, and therefore face region F1 moves towards the center of extraction frame $B_n$. In this case, the entire motion vector between the n-th and (n+1)-th frame images is directed to the "left."

Generally, a composition such that a human face is located at the edge portion of the valid imaging region (namely, extraction frame) is unfavorable, so a photographer tries to avoid such a composition. Therefore, it is likely that the (n+1)-th frame image as shown in FIG. 10A has been obtained due to camera shake. Accordingly, when the (n+1)-th frame image as shown in FIG. 10A is obtained, discrimination unit 23 discriminates that movement of imaging device 1 between the n-th and (n+1)-th frames has been caused by camera shake, and transmits a camera shake detection signal to extraction controller 24.

On the other hand, it is likely that the (n+1)-th frame image as shown in FIG. 10B has been obtained due to deliberate camera movement (pan operation) with an intention to place the face into a frame. Accordingly, when the (n+1)-th frame image as shown in FIG. 10B is obtained, discrimination unit 23 discriminates that movement of imaging device 1 between the n-th and (n+1)-th frames has been caused by deliberate camera movement, such as pan operation, and transmits a pan-tilt detection signal to extraction controller 24.

In an actual processing, discrimination unit 23 detects a moving direction (hereinafter described as moving direction $M_{n+1}$) of target face region F1 between the n-th and (n+1) frames within the frame image (or extraction frame) based on face position data of the n-th and (n+1)-th frame images. For detecting moving direction $M_{n+1}$, face position data of the frame images before the n-th frame image may also be referred.

Then, based on moving direction $M_{n+1}$ with reference to the positional relationship between target face region F1 and extraction frame $B_n$, discrimination unit 23 discriminates whether target face region F1 shifts towards out of extraction frame $B_n$, target face region F1 shifts inward to enter extraction frame $B_n$, or neither case is applicable.

For example, as shown in FIG. 10A, in the case where target face region F1 is moving in the direction to go out of extraction frame $B_n$ to the left between the n-th and (n+1)-th frame images, when entire motion vector $V_{n+1}$ between the n-th and (n+1)-th frame images is directed to the right, discrimination unit 23 discriminates that the movement of target face region F1 is caused by movement of imaging device 1, and that the movement of imaging device 1 corresponding to entire motion vector $V_{n+1}$ is camera shake.

Moreover, for example, as shown in FIG. 10B, in the case where target face region F1 is moving in the direction to enter extraction frame $B_n$ (namely right direction) between the n-th and (n+1)-th frame images, when entire motion vector $V_{n+1}$ between the n-th and (n+1)-th frame images is directed to the left, discrimination unit 23 discriminates that the movement of target face region F1 is caused by movement of imaging device 1, and that the movement of imaging device 1 corresponding to entire motion vector $V_{n+1}$ is deliberate camera movement.

In addition, discrimination unit 23 also discriminates between camera shake and deliberate camera movement based on regions other than face region. A variety of other methods for discriminating between camera shake and deliberate camera movement are available. Discrimination unit 23 performs the final discrimination between camera shake and deliberate camera movement additionally using any of such methods. For example, when a pan-tilt discrimination condition, "the same direction of entire motion vector is continuously maintained for the predetermined number of frames," is satisfied, discrimination unit 23 determines that movement of imaging device 1 is caused by deliberate camera movement regardless of the discrimination result based on face region, and outputs a pan-tilt detection signal to extraction controller 24.

Extraction controller 24 controls a position of an extraction frame to be formed within each frame image based on the entire motion vector determined by motion detection unit 22 and the discrimination result determined by discrimination unit 23. In summary, when a camera shake detection signal is output from discrimination unit 23, camera shake correction is performed to move the extraction frame in the opposite direction of the entire motion vector, and when a pan-tilt detection signal is output from discrimination unit 23, camera shake correction is aborted.

Figure 11A:
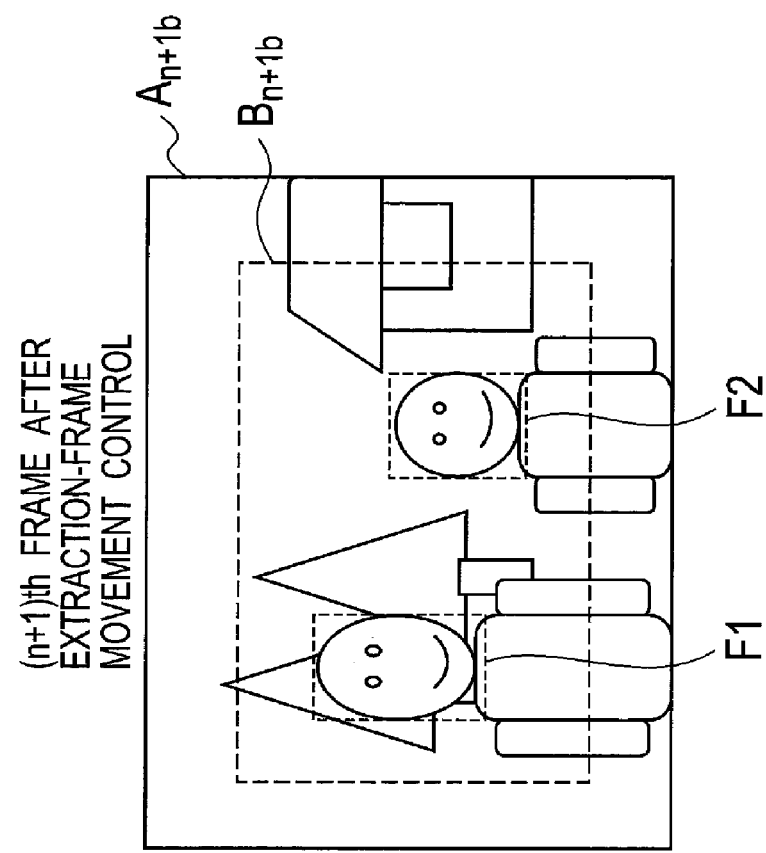
FIG. 11 is a view showing an (n+1)-th frame image after movement control of an extracted frame according to the first embodiment.
Figure 11B:
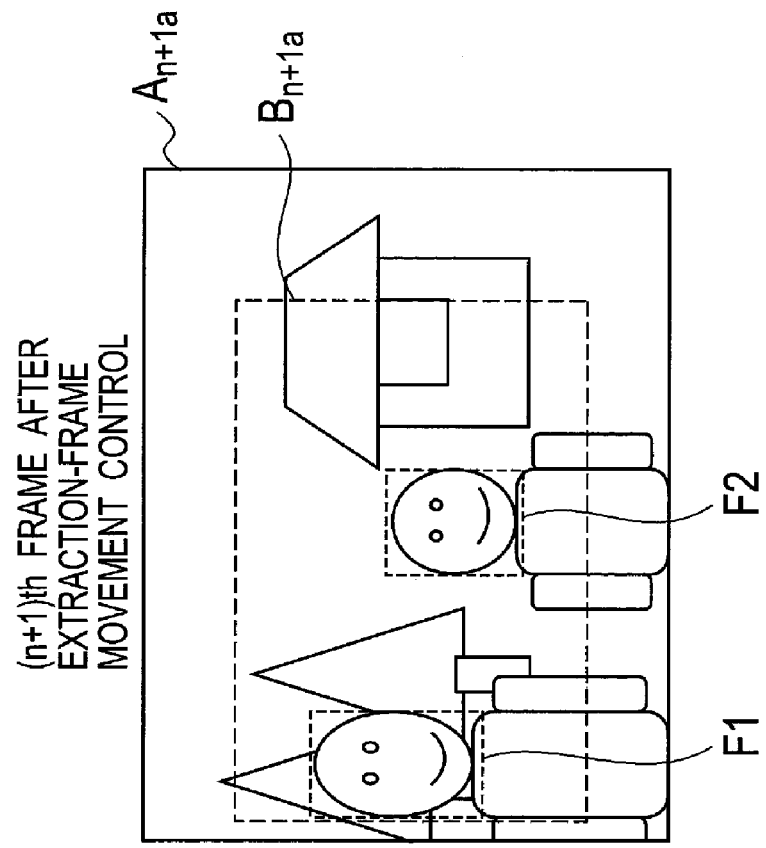

FIG. 11A shows extraction frame $B_{n+1a}$ for the (n+1) frame image shown in FIG. 10A, and FIG. 11B shows extraction frame $B_{n+1b}$ for the (n+1) frame image shown in FIG. 10B.

Extraction frame $B_{n+1a}$ and $B_{n+1b}$ are defined in the (n+1)-th frame image by extraction frame movement control performed by extraction controller 24. Each of the images in extraction frames $B_{n+1a}$ and $B_{n+1b}$ after the extraction frame movement control is displayed as an extraction image corresponding to the (n+1)-th frame, on display unit 15, and may be recorded on recording medium 16 as required.

As an actual measures for extraction frame move control, the method described in, for example, Japanese Patent Application Laid-Open Publication No. 2006-101485 may be adopted. This method will be briefly explained. Incidentally, for convenience of explanation, a state, where a camera shake detection signal is output from discrimination unit 23, is called a camera shake state, and a state, where the pan-tilt detection signal is output from discrimination unit 23, is called a pan-tilt state.

In a camera shake state, extraction controller 24 acquires an integral vector using the entire motion vector. An (n−1)-th frame and an n-th frame are assigned as a previous frame and a current frame, respectively, and an entire motion vector between the previous and current frames is expressed by $V_n$. An integral vector for the previous frame is expressed by $S_{n-1}$, and that for the current frame is expressed by $S_n$.

Figure 12:
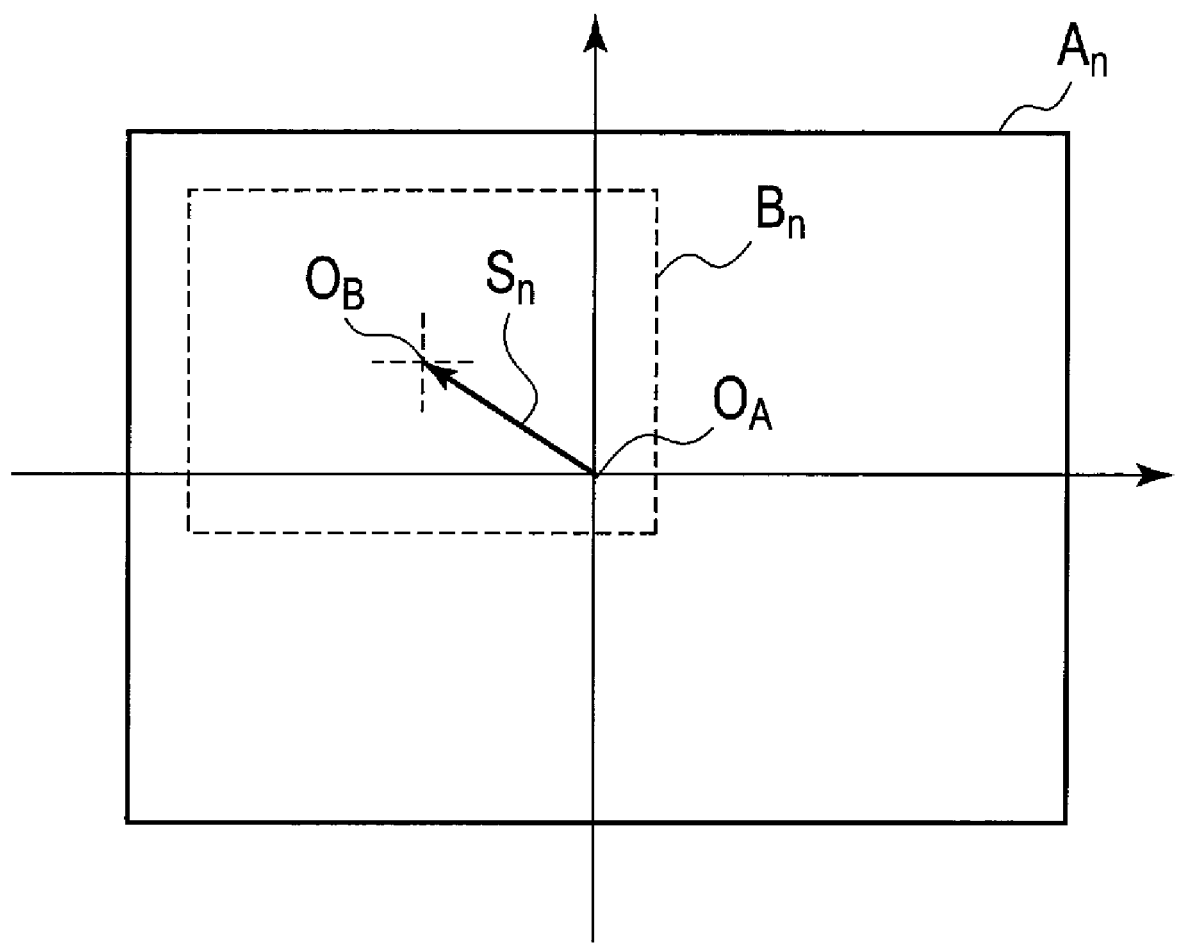
FIG. 12 is a view for explaining an integral vector defined by an extraction controller shown in FIG. 3.

FIG. 12 shows a relationship among entire region $A_n$ of the frame image of the current frame, extraction frame $B_n$ of the current frame, and integral vector $S_n$. Incidentally, for convenience of explanation of the illustration, the relationship between $A_n$ and $B_n$ in FIG. 12 in terms of size has been made different from that in FIG. 7 and other figures.

In an XY coordinate system with the center $O_A$ of the entire region $A_n$ of the frame image as the origin, a position of extraction frame $B_n$ is given by coordinates of the center $O_B$ of the extraction frame $B_n$. While the position of the center $O_A$ is common to the respective frame images, coordinates of the center of an extraction frame can vary depending on extraction frame movement control performed by extraction controller 24. Integral vector $S_n$ is directing to the center $O_B$ of extraction frame $B_n$ from the center $O_A$, and a coordinate position, which has been moved in the direction shown by integral vector $S_n$ from the center $O_c$, represents a coordinate position of the center $O_B$ of extraction frame $B_n$.

In the camera shake state, extraction controller 24 obtains an attenuation coefficient K of an integral vector using a focal length F at 35 mm film conversion in the optical system of imaging unit 11, a predetermined minimum value $F_{min}$ and a maximum value $F_{max}$ of the focal length, a predetermined minimum value $K_{min}$ and a maximum value $K_{max}$ of an attenuation coefficient of a integral vector according to the following equation (1):

$$K = K\text{min} + \frac{F - F\text{min}}{F\text{max} - F\text{min}} (K\text{max} - K\text{min}) \qquad (1)$$

Then, integral vector $S_n$ of the current frame is calculated based on the following equation (2):

$$S_n = K \cdot (S_{n-1} - C) + V_n + C \qquad (2)$$

Here, C represents an attenuation center (attenuation center vector), which is also a two-dimensional vector as well as the integral vector. The initial value of the attenuation center C is 0, and the value is updated according to the following equation (3) every time integral vector $S_n$ is calculated according to the equation (2). In other words, a vector amount of the right side of equation (3) is newly substituted by C every time when the integral vector $S_n$ is calculated. $K_C$ in the equation (3) is a predetermined attenuation coefficient of the attenuation center.

$$C = K_C \cdot C \quad (3)$$

On the other hand, in the pan-tilt state, integral vector $S_n$ of the current frame is calculated according to the following equation (4). In other words, integral vector $S_{n-1}$ of the previous frame stored in extraction controller 24 is set to be integral vector $S_n$ of the current frame.

$$S_n = S_{n-1} \quad (4)$$

Moreover, when a transition takes place from the pan-tilt state to the camera shake state, extraction controller 24 substitutes integral vector $S_n$ at the time of the transition into attenuation center C. Therefore, in this case, integral vector $S_{n+1}$ for the next frame can be calculated according to the equation, "$S_n = K \cdot (S_{n-1} - C) + V_n + C$" (see equation (2)).

Extraction controller 24 calculates integral vector $S_n$ as described above, decides the position of extraction frame $B_n$ according to integral vector $S_n$, and then outputs an image in extraction frame $B_n$ as an extracted image of the current frame. The extracted image is displayed on display unit 15, and may be recorded on recording medium 16 as required.

As described above, when a face region located at the edge portion of the extraction frame (valid imaging region) shifts towards out of the extraction frame (valid imaging region) due to movement of imaging device 1, the movement is determined to be caused by unintentional camera movement, and therefore camera shake correction is performed so that the face region can stay within the extraction frame. On the other hand, when the face region shifts inward to enter the extraction frame (valid imaging region) due to movement of imaging device 1, it is determined that the movement is caused by deliberate camera operation, and therefore the position of the extraction frame is controlled so that the face region can easily be included in the extraction frame.

This process solves the problem in which camera shake correction is erroneously performed on deliberate camera operation for attempting to include a face located at the edge portion of the displayed image, the attempt to include the face is inhibited, and, as a result, a unnatural image is displayed (as if the display image is staggered). At the same time, in the case where a face located at the edge portion of a displayed image may shift towards out of the frame, camera shake correction can be appropriately performed.

Incidentally, in the above-described example, the motion between adjacent photographed images is detected as an entire motion vector from an image signal of the photographed image, and the entire motion vector is treated as motion data representing movement of imaging device 1. However, with imaging device 1 provided with a detection sensor (not shown) for outputting motion data representing the movement of imaging device 1, the movement of imaging device 1 may be detected according to the output data from the detection sensor. It is possible to calculate the equivalent state quantity according to the motion data from the detection sensor as that based on the above-described entire motion vector, and perform the same processing using the calculated state quantity. The detection sensor may be, for example, an angular velocity sensor that detects an angular velocity of imaging device 1, an angular velocity sensor that detects an angle of imaging device with respect to a predetermined axis, and an angular velocity sensor that detects an acceleration of imaging device 1 (all are not shown in the figure).

Although camera shake correction is achieved by moving an extraction frame within a captured image (maximum photographable region), camera shake correction can be performed by imaging unit 11 when the above-described detection sensor is used. A valid imaging region is also set by imaging device 1 in this case, and an image in the valid imaging region is displayed on display unit 15, and may be recorded on recording medium 16 as required.

In the case where camera shake correction is performed in imaging unit 11, for example, a correcting lens or Vari-Angle Prism (neither is shown in the figure) is provided in the optical system of imaging unit 11. In order to cancel blurring of an optical image on the imaging device of imaging unit 11 due to camera shake, the correcting lens is moved two-dimensionally on a plane perpendicular to an optical axis, or the Vari-Angle Prism is drive-controlled, and thereby camera shake correction is performed. Alternatively, for example, a drive mechanism (not shown) which performs drive control on the imaging device of imaging unit 11 is provided. Then, in order to cancel blurring of an optical image on the imaging device of imaging unit 11 due to camera shake, the imaging device is moved two-dimensionally on a plane perpendicular to an optical axis, and thereby camera shake correction is performed.

Second Embodiment

Figure 13:
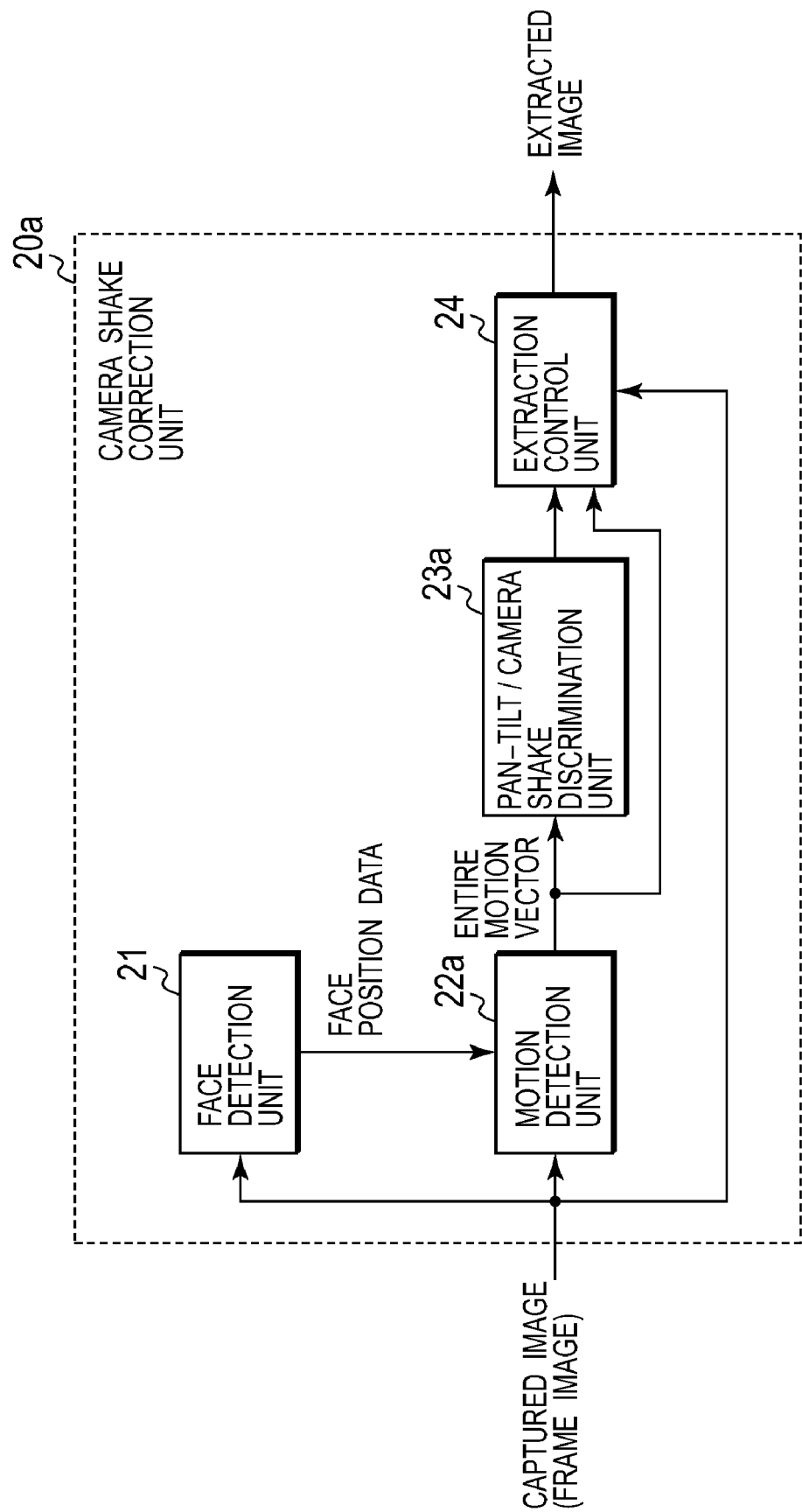
FIG. 13 is a functional block diagram of a camera shake correction unit provided in the controller shown in FIG. 1 according to the second embodiment.

A second embodiment will be next explained. FIG. 13 is a functional block diagram of camera shake correction unit 20a which performs the camera shake correction according to the second embodiment. Camera shake correction unit 20a has face detection unit 21, motion detection unit 22a, pan-tilt/camera shake discrimination unit 23a (hereinafter referred to as discrimination unit 23a) and extraction controller 24.

Face detection unit 21 extracts a face region from each photographed image, and creates face position data, in a similar way to that described in the first embodiment. The face position data created by face detection unit 21 is then given to motion detection unit 22a.

Motion detection unit 22a calculates an entire motion vector in the same process as motion detection unit 22 according to the first embodiment does. In this process, a face region is set to be excluded from a motion detection region extracted for calculating the entire motion vector based on the face position data This process of excluding a face region from a motion detection region will be further explained in detail by referring to a specific example. FIG. 7 is used as a reference. At the start, suppose that the face region F1 has been extracted from the n-th frame image. To simplify the explanation, the face region F2 is set aside. Face position data of face region F1 is transmitted to motion detection unit 22a. Motion detection unit 22a does not take into consideration the divided regions AR [i, j] (see FIG. 4) corresponding to the face region F1 upon calculating the entire motion vector $V_n$ between the (n−1)-th and n-th frames and/or the entire vector $V_{n+1}$ between the n-th and (n+1)-th frames.

Figure 14:
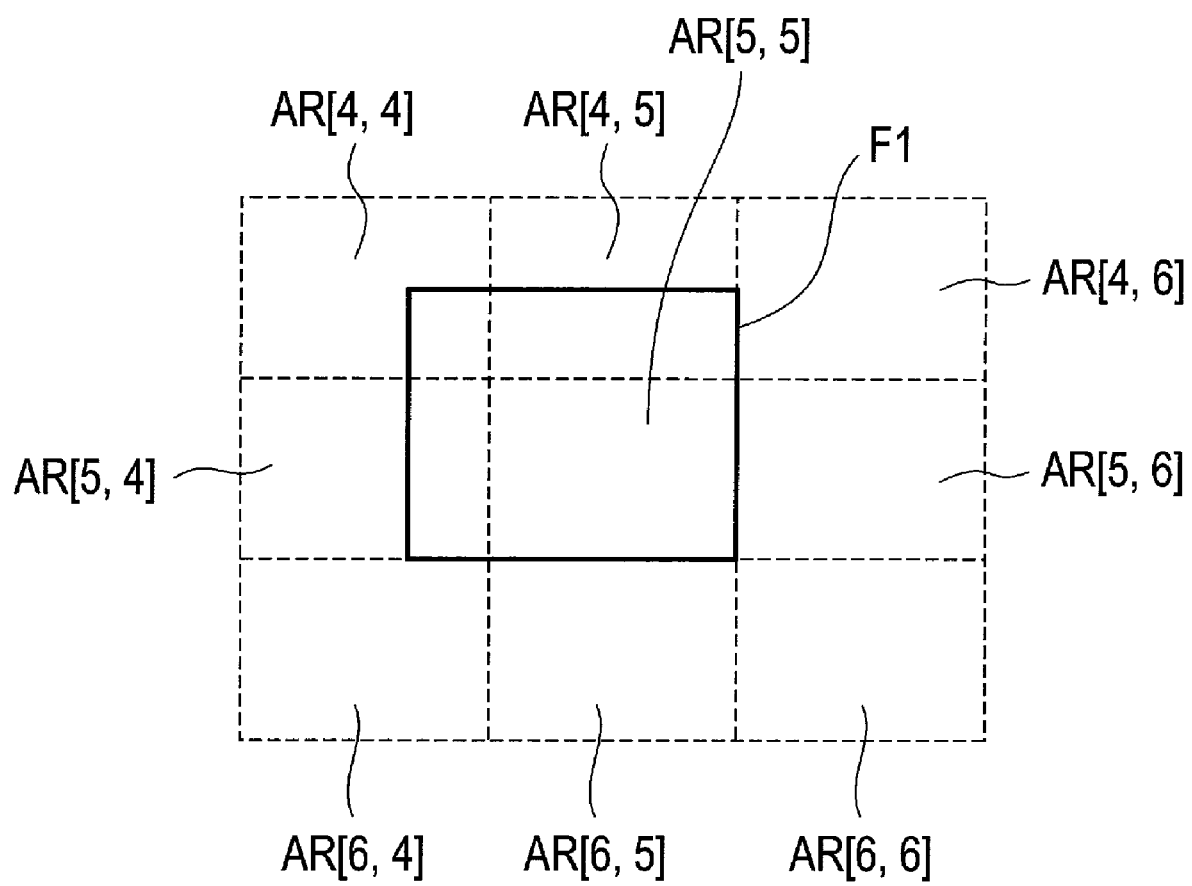
FIG. 14 is a view for explaining a face region exclusion function by a motion detection unit shown in FIG. 13.

For example, suppose that, in the n-th frame image, the face region F1 overlaps with the four divided regions, AR [4, 4], AR [4, 5], AR [5, 4] and AR [5, 5], as shown in FIG. 14. In this case, motion detection unit 22a identify the four divided regions, AR [4, 4], AR [4, 5], AR [5, 4] and AR [5, 5], as excluded divided regions, and set them aside upon calculating the entire motion vector $V_n$ and/or the entire vector $V_{n+1}$.

In addition, motion detection unit 22a discriminates whether each of the divided regions except the above-described four excluded divided regions is valid or invalid in the manner described in the first embodiment. Then, motion detection unit 22a calculates an average vector of region motion vectors corresponding to the divided regions AR [i, j] which have not been identified as excluded divided regions and have been determined to be valid, and outputs the average vector as an entire motion vector. There are generally multiple divided regions AR [i, j] which have not been identified as excluded divided regions and have been determined to be valid, and a combined region including the multiple divided regions serves as a motion detection region used for detecting an entire motion vector.

Alternatively, a divided region, such as the divided region AR [4, 4] in FIG. 14, only partially overlapping with the face region F1, may not be identified as an excluded divided region depending on the size of the overlapping portion. Although the face region F2 has been set aside in this explanation, the face region F2 would be processed in the same manner as described above for the processing of the face region F1.

Discrimination unit 23a discriminates whether movement of imaging device 1 between the adjacent frames is deliberate camera movement or camera shake based on the entire motion vector calculated by motion detection unit 22a. Discrimination unit 23a outputs a pan-tilt detection signal to extraction controller 24 upon determining the movement to be deliberate camera movement, and outputs a camera shake detection signal to extraction controller 24 upon determining the movement to be camera shake. For example, when the pan-tilt discrimination condition described in the first embodiment is fulfilled, extraction control 23a outputs a pan-tilt detection signal, and when it is not fulfilled, extraction control 23a outputs a camera shake detection signal.

Extraction controller 24 is the same as that in the first embodiment. Upon referring the output signal from discrimination unit 23a, extraction controller 24 performs camera shake correction based on the entire motion vector, which is motion data representing movement of imaging device 1, in the same manner described in the first embodiment, and thereby generate an extraction image. The extraction image is displayed on display unit 15, and may be recorded on recording medium 16 as required.

Any movement different from camera shake in the image decreases reliability of motion vector detection for camera shake correction. When a person is a photographic subject, it is highly likely that the subject moves in any way. Therefore, as described above, a face region is excluded from a motion detection region. As a result, it becomes possible to increase reliability of motion vector detection for camera shake correction, and to achieve more appropriate camera shake correction.

A modification of the second embodiment is described below. In the processing as described above, if a face region continuously stays within the imaging region, the face region is always to be excluded from the motion detection region. However, it may be set that, only when a face region is newly extracted, the face region is excluded from the motion detection region.

Figure 15:
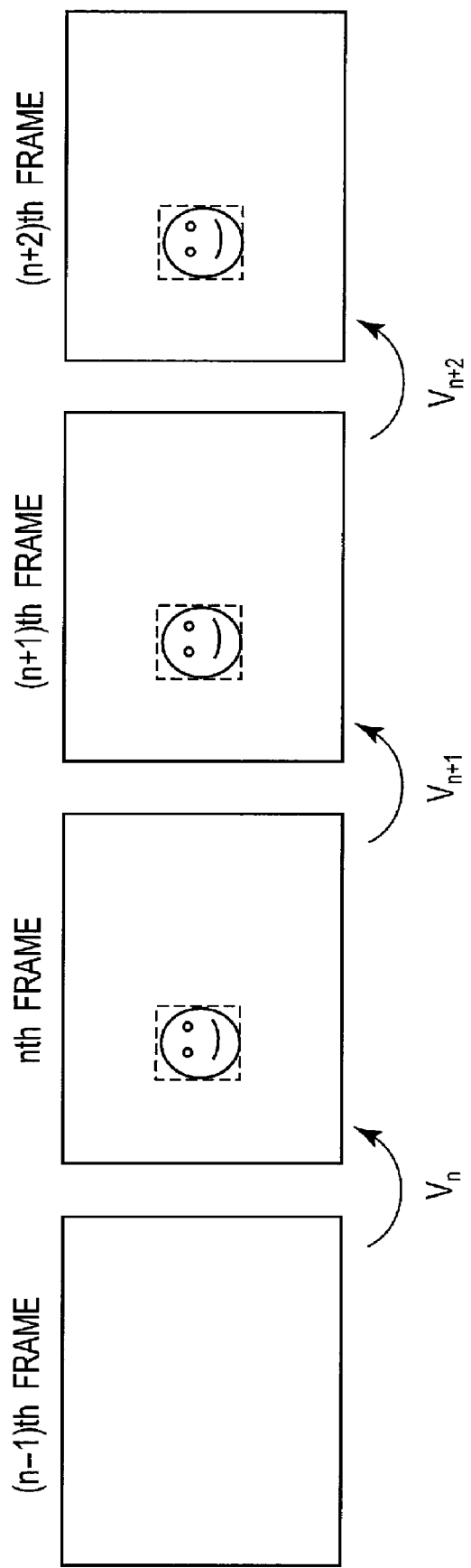
FIG. 15 is a view showing a state of transition of the respective frame images according to the second embodiment.

To be more specific, for example, as shown in FIG. 15, suppose that no face region exists before the n-th frame image, a face region is firstly extracted in the n-th frame image, and the face region stays within the following frame images. In this case, any divided region AR [i, j] overlapping with the face region is to be excluded from the motion detection region for calculation of an entire motion vector $V_n$ between the (n−1)-th and the n-th frames, but no divided region AR [i, j] overlapping with the face region is to be excluded from the motion detection region for calculation of other entire motion vectors.

Figure 16:
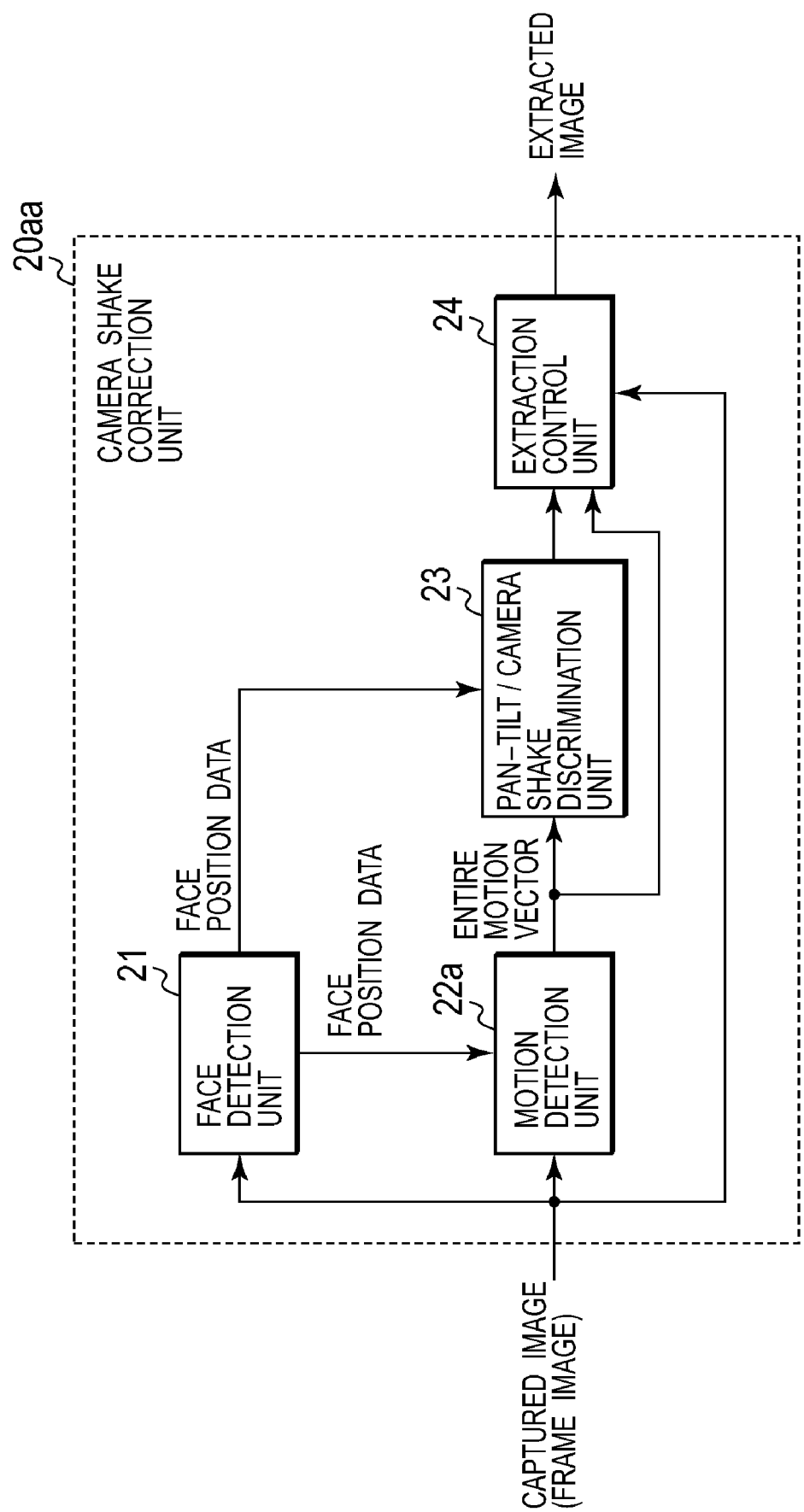
FIG. 16 is a view showing a modification of the camera shake correction unit shown in FIG. 13 (or FIG. 3).

Alternatively, camera correction unit 20a in FIG. 13 may be modified as camera correction unit 20aa shown in FIG. 16. Camera correction unit 20aa is equivalent to a combination of camera shake correction unit 20 in FIG. 3 and camera shake correction unit 20a in FIG. 13. Motion detector unit 22 in camera shake correction unit 20 in FIG. 3 is replaced with motion detection unit 22a in camera shake correction unit 20aa, and, except for the single difference, camera shake correction unit 20 and camera shake correction unit 20aa are the same.

Similar to the first embodiment, based on an entire motion vector created by motion detection unit 22a, and face position data created by face detection unit 21, discrimination unit 23 in camera correction unit 20aa discriminates whether movement of imaging device 1 between the adjacent frames is deliberate camera movement or camera shake. According to the discrimination result, discrimination unit 23 outputs a camera shake detection signal or pan-tilt determination signal to extraction controller 24. With camera correction unit 20aa, it is possible to obtain both effects of the first and second embodiments.

Third Embodiment

Figure 17:
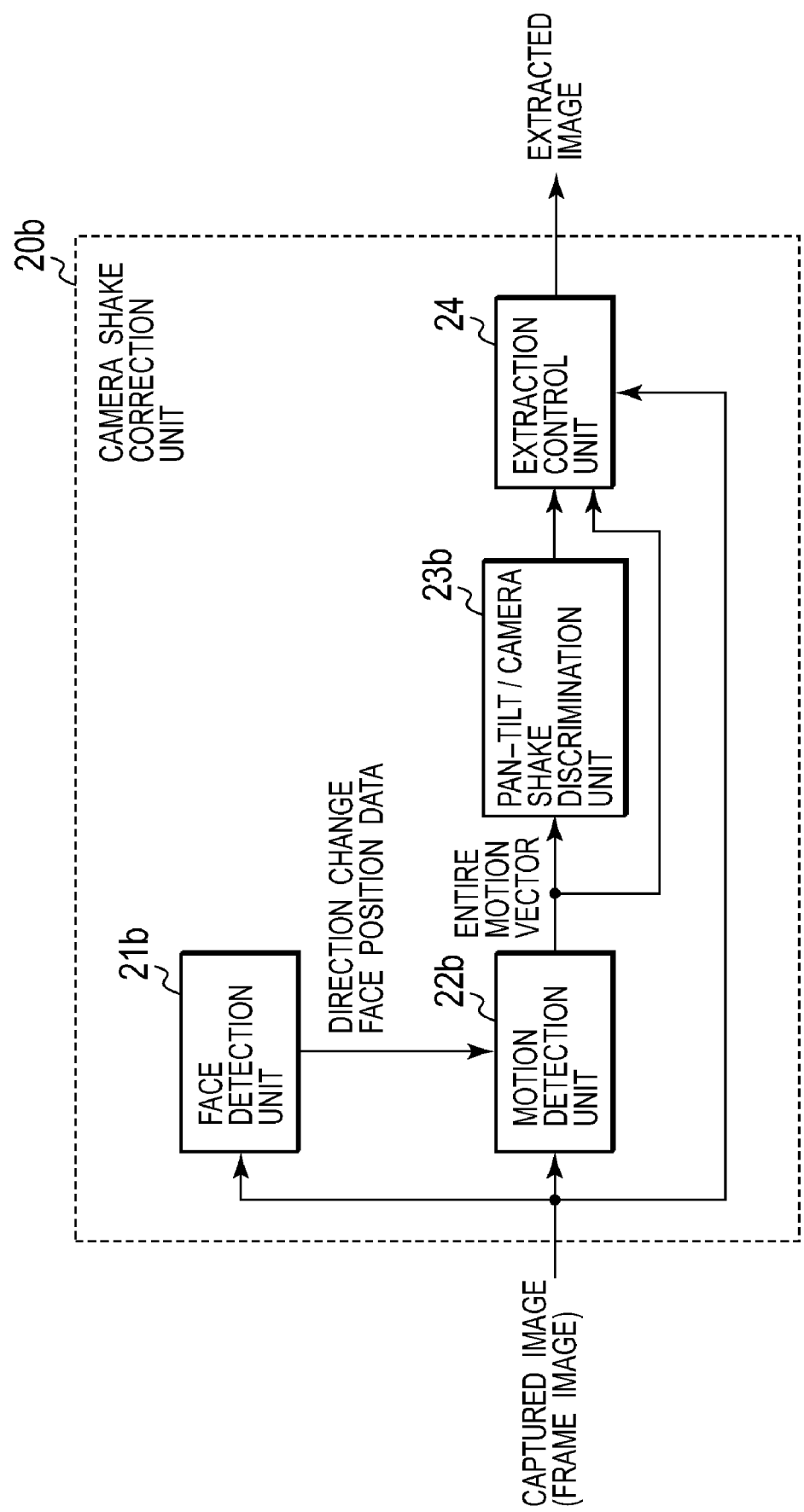
FIG. 17 is a functional block diagram of a camera shake correction unit provided in the controller shown in FIG. 1 according to a third embodiment.

A third embodiment will be next explained. FIG. 17 is a functional block diagram of camera shake correction unit 20b which performs camera shake correction according to the third embodiment. Camera shake correction unit 20b has face detection unit 21, motion detection unit 22b, pan-tilt/camera shake discrimination unit 23b (hereinafter referred to as discrimination unit 23b), and extraction controller 24.

Face detection unit 21b extracts, as described in the first embodiment, a face region from each photographed image. In addition, face detection unit 21b also detects the direction of any face detected in each photographed image. In other words, face detection unit 21b discriminates whether a face detected in a photographed image is a frontal face (face from an anterior view), a side face (face from a lateral view), or an angle face (face from a diagonal view).

In the actual process, the direction of a face is detected as an angle with reference to the frontal face. This angle is expressed based on a unit of, for example, 30°. In other words, the angle of face direction is detected as any one of angles −90°, −60°, −30°, 0°, +30°, +60° and +90°. The angle of a frontal face is 0°, the angle of a side face is −90° or +90°, and the angle of an angle face is −60°, −30°, +30° or +60°. With reference to the front face, the angle formed on the right is expressed in a positive degree, and the angle formed to the left is expressed in a negative degree.

Various methods are proposed for detecting the direction of a face, and face detection unit 21b may adopt any of such methods.

For example, as in the method described in Japanese Patent Application Laid-Open Publication No. HEI 10-307923, face parts, such as eyes, nose, and mouth, are picked up in order from a photographed image, the position of the face in the image is detected, and the face direction (angle) is detected based on projection data of the face parts.

Alternatively, the method described in Japanese Patent Application Laid-Open Publication No. 2006-72770 may also be adopted. According to this method, one frontal face is recognized as the left half (hereinafter referred to as the left face) and the right half (hereinafter referred to as the right face), and a parameter is created for each of the left face and the right face through learning processing. For face detection, a target region in the photographed image is divided into right and left regions, and similarity between each of the divided target regions obtained as above and the corresponding parameter among the parameters described above is calculated. When one or both degree of similarity is above a threshold value, it is determined that the target region is a face region. Furthermore, a face direction (angle) is detected by comparing similarities among the divided target regions in terms of size. Only upon detecting a change in the face direction, face detection unit 21b transmits corresponding data (direction altered face position data to be described later) to motion detection 22b.

This will be explained further in detail by referring to an example. Suppose that, as shown in FIG. 18, in the (n–1)-th frame image, a single face has been detected, and face region 120 has been extracted, and, in the n-th frame image a single, a single face has also been detected, and face region 121 has been extracted. Face detection unit 21b compares the center position of the image between the face regions 120 and 121. When the distance between the center positions of the face regions is a predetermined value or below, face detection unit 21b determines that both face regions are derived from the same face.

Then, suppose that it has been determined that the positions of both face regions in the images are the same or substantially the same, and that both face regions are derived from the same face. In this case, face detection unit 21b compares the face direction (angle) between the face regions 120 and 121, and determines whether or not the face direction has changed. As shown in FIG. 18, when the face direction has changed between the (n–1)-th and n-th frames, face detection unit 21b outputs direction altered face position data for the n-th frame image to motion detection unit 22b. The direction altered face position data represents the position of the face region with the face direction altered (face region 121 in this example) on the photographed image (namely, coordinate position on the image).

Motion detection unit 22b calculates an entire motion vector in the same manner as motion detection 22 of the first embodiment. Incidentally, when direction altered face position data is given, the face region corresponding to the direction altered face position data is excluded from a motion detection region for calculating an entire motion vector. In this example, since the direction altered face position data representing the position of the face region 121 within the n-th frame image is given, motion detection unit 22b excludes any divided region AR [i, j] corresponding to the face region 121 (see FIG. 4) upon calculating an entire motion vector $V_n$ between the (n–1)-th and the n-th frames.

The idea in the exclusion processing is the same as that of the second embodiment. For example, within the n-th frame image, when the face region 121 overlaps with four divided regions, AR [4, 4], AR [4, 5], AR [5, 4], and AR [5, 5], motion detection unit 22b identifies the four divided regions as excluded divided regions, and set them aside upon calculating an entire motion vector $V_n$.

In addition, motion detection unit 22b discriminates whether each of the divided region except the above-mentioned four excluded divided regions is valid or invalid in the manner described in the first embodiment. Then, the motion detection unit 22b calculates an average vector of region motion vectors corresponding to the divided regions AR [i, j], which have not been identified as excluded divided regions and have been determined to be valid, and outputs the average vector as an entire motion vector. There are generally multiple divided regions AR [i, j] which have not been identified as excluded divided regions and has been determined to be valid, are a combined region including the multiple divided regions serves as a motion detection region used for detecting an entire motion vector.

Discrimination unit 23b discriminates whether movement of imaging device 1 between the adjacent frames is deliberate camera movement or camera shake based on the entire motion vector calculated by motion detection unit 22b. Discrimination unit 23a outputs a pan-tilt detection signal to extraction controller 24 upon determining the movement to be deliberate camera movement, and outputs a camera shake detection signal to extraction controller 24 upon determining the movement to be camera shake. For example, when the pan-tilt discrimination condition described in the first embodiment is fulfilled, extraction control 23a outputs a pan-tilt detection signal, and when it is not fulfilled, extraction control 23a outputs a camera shake detection signal.

Extraction controller 24 is the same as that in the first embodiment. Upon referring the output signal from discrimination unit 23b, extraction controller 24 performs camera shake correction based on the entire motion vector, which is motion data representing movement of imaging device 1, in the same manner described in the first embodiment, and thereby generate an extraction image. The extraction image is displayed on display unit 15, and may be recorded on recording medium 16 as required.

Any movement different from camera shake in the image decreases reliability of motion vector detection for camera shake correction. When a person is a photographic subject, it is highly likely that the subject moves in any way, and one of such movements is a change in the face direction. Therefore, as described above, when any change in the face direction is detected, it is determined that the change is derived from movement of a photographic subject, and a face region corresponding to the face in which the change was observed is excluded from a motion detection region. As a result, it becomes possible to increase reliability of motion vector detection for camera shake correction, and to achieve more appropriate camera shake correction.

Figure 19:
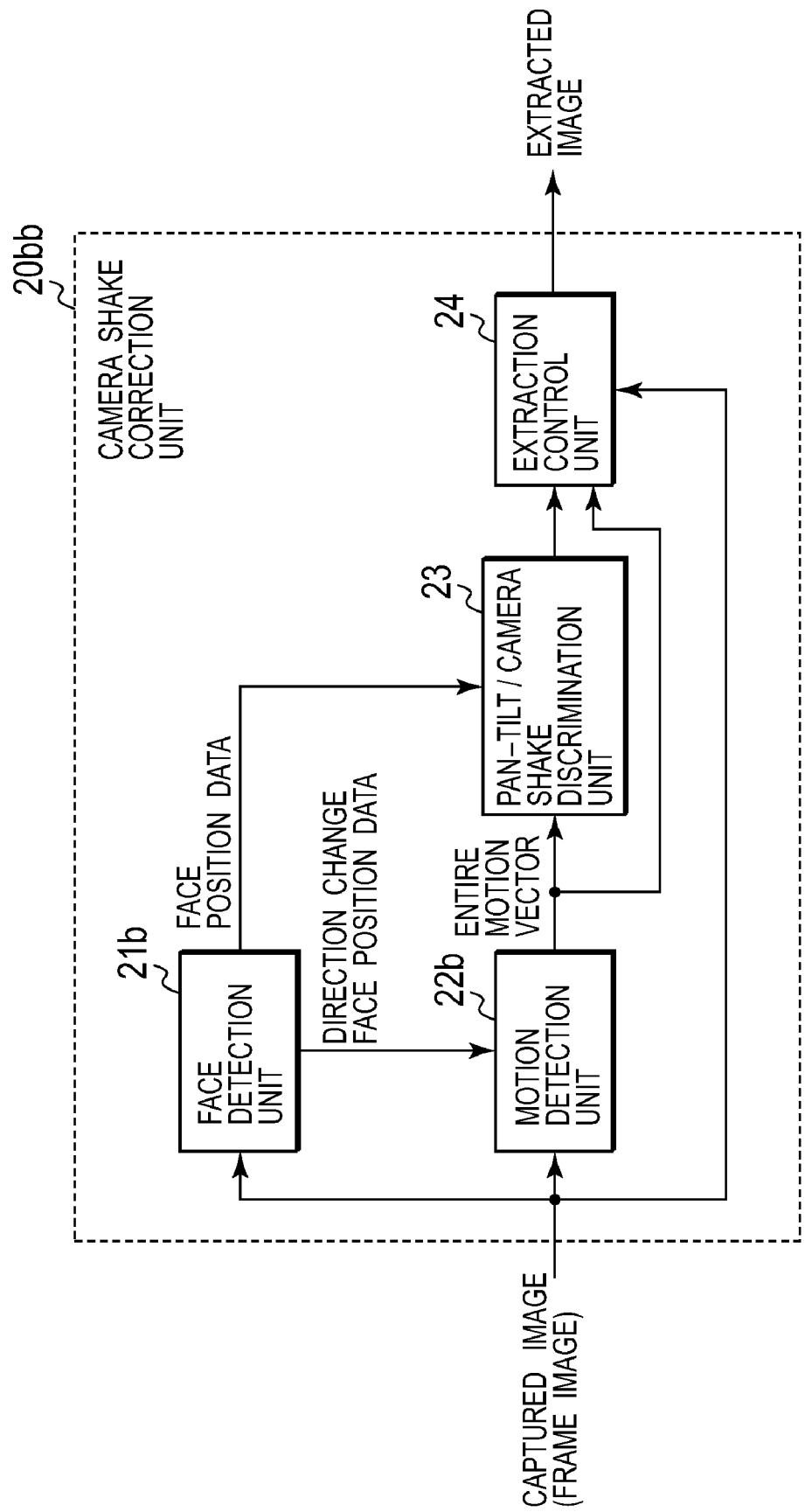
FIG. 19 is a view showing a modification of a camera shake correction unit shown in FIG. 17 (or FIG. 3).

Alternatively, camera correction unit 20b in FIG. 17 may be modified as camera correction unit 20bb shown in FIG. 19. Camera correction unit 20bb is equivalent to a combination of camera shake correction unit 20 in FIG. 3 and camera shake correction unit 20b in FIG. 17. Face detection unit 21 motion detector unit 22 in camera shake correction unit 20 in FIG. 3 are replaced with face detection unit 21b and motion detection unit 22b in camera shake correction unit 20bb, and, except for the single difference, camera shake correction unit 20 and camera shake correction unit 20bb are the same. However, when a face region is extracted in a photographed image, face detection unit 21b in camera correction unit 20bb outputs face position data to discrimination unit 23, regardless of the change in the face direction in the photographed image, in the same manner as face detection 21 in the first embodiment does.

Similar to the first embodiment, based on an entire motion vector created by motion detection unit 22b, and face position data created by face detection unit 21b, discrimination unit 23 in camera correction unit 20bb discriminates whether movement of imaging device 1 between the frames next to each other is deliberate camera movement or camera shake. According to the discrimination result, discrimination unit 23 outputs a camera shake detection signal or pan-tilt determination signal to extraction controller 24. With camera correction unit 20bb, it is possible to obtain both effects of the first and third embodiments.

Fourth Embodiment

In the first embodiment, with consideration given to the possibility that a face is the main photographic subject, a human face is particularly adopted as a factor for discriminating between deliberate camera movement and camera shake. However, the factor is not limited to a face. For example, it is also possible that a main photographic subject is detected from the photographed image using color detection, edge detection, or pattern recognition, a main photographic subject region including the entire or a part of the main photographic subject is extracted from the photographed image, and then the processing described in the first embodiment is performed on the main photographic subject region. In this case, the main photographic subject and the main photographic subject region correspond to the face and the face region described in the first embodiment, respectively.

This process solves the problem in which camera shake correction is erroneously performed on deliberate camera operation for attempting to include a main photographic subject located at the edge of the displayed image, the attempt to include the face is inhibited, and, as a result, a unnatural image is displayed (as if the display image is staggered). At the same time, in the case where a main photographic subject located at the edge portion of a displayed image may go out of the frame, camera shake correction can be appropriately performed.

Such a modification example of the above-described first embodiment will be explained as a fourth embodiment. A main photographic subject will be explained in the following section by referring to examples.

First Example of Main Photographic Subject

For example, flowers and cooked food (or food material itself) may be main photographic subjects. Since these items generally have high color saturation, they can be easily discriminated from others on an image. Color saturation is specified according to an image signal representing a photographed image. For example, a main photographic subject detection unit (not shown) classifies regions in a photographed image into those with relatively high color saturation and with relatively low color saturation by using a generally-known method, such as a region-dividing technique, and extracts the regions with relatively high color saturation as the main photographic subject region. When a flower with relatively high color saturation is a photographic target, the entire or a part of the flower is to be included in the extracted main photographic subject region. In an actual processing, for example, an image portion with color saturation within a predetermined range is specified in each photographed image, and the specified image portion is extracted as a main photographic subject region. The main photographic subject detected in this manner has an image characteristic (characteristic on the image) of having relatively high color saturation.

Alternatively, when a person is a photographic subject, the face of the person can be detected by the face detection unit 21. A color saturation of the person's clothes, which is lower region of the detected face, can be detected. The detected region of the color saturation is extracted as a main photographic subject region.

When imaging modes of imaging device 1 includes a macro photography mode, a flower photography mode, or a food photography mode, and any of the imaging modes is selected, it is reasonable to assume that the main photographic subject has relatively high color saturation. This is because it is highly likely that the main photographic subject a photographer is focusing on is flowers and other similar matters when any one of these imaging modes is selected.

The macro photography mode is suitable for photographing a subject close to imaging device 1, the flower photography mode is suitable for photographing flowers, and the cooking photography mode is suitable for photographing cooked food (or food material itself). These imaging modes can be selected by a predetermined operation on operation unit 14 shown in FIG. 1.

Second Example of Main Photographic Subject

Alternatively, a main photographic subject may be detected through edge detection processing or contrast detection processing. This is possible because a photographer generally attempts to focus on a targeted main photographic subject, and therefore, an amount of edge components or amount of contrast of the image portion including the main photographic subject appears becomes relatively large.

Specifically, as an example, edge component is calculated for each image portion in a photographed image by calculating, for example, a difference in a luminance value between adjacent pixels in the photographed image. Then, an image portion with relatively large number of edge components compared to that of other portions is specified as a main photographic subject region. Furthermore, for example, a predetermined high frequency component of a luminance signal in a photographed image is extracted, and an amount of contrast of each image portion in the photographed image is evaluated based on the extracted high frequency component. Then, an image portion with a relatively larger amount of contrast compared to that of other image portions is specified as a main photographic subject region.

Such main photographic subject regions should include the entire or a part of a main photographic subject. The main photographic subject detected in these manners has an image characteristic (characteristic on the image) of having relatively large edge component or amount of contrast.

Third Example of Main Photographic Subject

Alternatively, a main photographic subject (an object of a predetermined type, for example, a car) may be detected through pattern recognition processing. In this case, regarding the captured image, registered pattern necessary for pattern recognition are stored in advance in a memory (not shown) provided to imaging device 1. Then, based on comparison between the photographed image and the registered pattern, an object coinciding with or similar to the registration pattern is detected as a main photographic subject from the photographic image, and a main photographic subject region including the entire or a part of the main photographic subject is extracted.

Each of the above-described main photographic subjects can be referred to as an object of a predetermined type or an object having a predetermined image characteristic, and the main photographic subject region can be referred to as an object region accordingly. An object region can be extracted according to a predetermined rule, "any of an image portion corresponding to a face, an image portion having relatively high color saturation, an image portion having a relatively large edge component or amount of contrast, and an image portion corresponding to an object coinciding with or similar to a registered pattern is included in an object region."

Modifications

Modifications 1 to 3 in the following section are modifications of the above-described embodiments. Any combination of the contents described in the following modifications is possible unless a contradiction arises.

Modification 1

Imaging device 1 in FIG. 1 can be formed by hardware or a combination of hardware and software. Particularly, the functions of each of camera shake correction units (20, 20a, 20aa, 20b and 20bb) can be implemented by hardware, software, or a combination of hardware and software.

Modification 2

When imaging device 1 is configured using software, a block diagram of a component provided by software represents a functional block diagram of the component. Furthermore, the entire or a part of the functions provided by each of camera shake correction units (20, 20a, 20aa, 20b, and 20bb) may be described as a program, and the program is executed on a program execution apparatus (for example, a computer), whereby the entire or a part of the functions can be implemented.

Modification 3

Each of motion detection units (22, 22a or 22b) or the detection sensor detects movement of imaging device 1 and output motion data of the movement, thereby function as a detection unit or motion detection unit. Extraction controller 24 functions as a correction unit. Each of face detection units (21 and 21b) functions as an object-region extraction unit or face region extraction unit. Face detection unit 21b of the third embodiment also functions as a face direction detection unit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A camera shake correction device comprising:
   a detection unit configured to detect movement of an imaging device, and to output motion data representing the detected movement;
   an object-region extraction unit configured to extract a target object region from a photographed image obtained by an imaging unit in the imaging device; and
   a correction unit configured to perform camera shake correction on the photographed image, wherein the correction unit performs the camera shake correction on the photographed image based on a moving direction of the target object region in the photographed image wherein when the moving direction of the target object image is outward of the photographed image, the correction unit performs the camera shake correction but when the moving direction of the target object image is inward of the photographed image, the correction unit does not perform the camera shake correction.

2. The camera shake correction device as claimed in claim 1, further comprising:
   a discrimination unit configured to receive the motion data of the extracted object region and to determine whether the movement of the imaging device is camera shake or intentional moving of the camera.

3. The camera shake correction device as claimed in claim 2, wherein the correction unit aborts execution of the camera shake correction processing when the discrimination unit determines that the movement of the imaging device is not camera shake.

4. The camera shake correction device as claimed in claim 1, wherein the object-region extraction unit detects an object of a predetermined type or an object having a predetermined image characteristic from each photographed image, and extracts a region including the entire object or a part of the object as the object region.

5. The camera shake correction device as claimed in claim 1, wherein the object-region extraction unit extracts a face region corresponding to a human face from the photographed image obtained by the imaging unit in the imaging device, and outputs position data of the extracted face region.

6. A camera shake correction device comprising:
   a detection unit configured to detect movement of an imaging device, and to output motion data representing the detected movement;
   an object-region extraction unit configured to extract a target object region from a photographed image obtained by an imaging unit in the imaging device, and to output position data of the extracted object region for each frame of the photographed image;
   a correction unit configured to perform camera shake correction on the photographed image based on the position data of the object region and the motion data; and
   a discrimination unit configured to receive the position data of the extracted object region for each frame and the motion data, and, to detect movement of the imaging device between adjacent frames based on the position data of the object region for each frame and on the motion data, and to determine whether the movement of the imaging device is camera shake,
   wherein said correction unit performs the camera shake correction processing on the camera shake based on the determination of the discrimination unit, wherein the discrimination unit determines that movement of the imaging device is camera shake upon detecting, based on the position data of the object region for each frame and the motion data, movement of the imaging device that causes the object region to move outward from an imaging region of the imaging unit, whereas the discrimination unit determines that the movement of the imaging device is not camera shake upon detecting movement of the imaging device causing the object region to move inward within the imaging region of the imaging unit.

7. An imaging device comprising:
   an imaging unit configured to photograph a subject, and output a photographed image; and
   a correction unit configured to detect camera shake of the imaging device based on the photographed image, to perform camera shake correction processing, and to output a valid photographed image which is a partial image of the photographed image, said correction unit comprising:
      a detection unit configured to detect movement of the imaging device, and to output motion data representing the movement;
      an object-region extraction unit configured to extract a target object region from a photographed image obtained by the imaging unit in the imaging device, and to output position data of the extracted object region for each frame of the photographed image;
      a discrimination unit configured to receive the position data of the extracted object region for each frame and the motion data, and, based on the position data of the object region for each frame and the motion data, to detect movement of the imaging device between adjacent frames, and to determine whether the movement of the imaging device is camera shake, and an extraction unit configured to perform camera shake correction for the photographed image on the basis of the discrimination result of the discrimination unit, to extract a valid photographed image from the photographed image, and to output the valid photographed image, wherein the discrimination unit determines that movement of the imaging device is camera shake upon detecting, based on the position data of the object region for each frame and the motion data, the movement of the imaging device that causes the object region to move outward from an imaging region of the imaging unit, whereas the discrimination unit determines that movement of the imaging device is not camera shake upon detecting the movement of the imaging device causing the object region to move inward within the imaging region of the imaging unit.

8. The imaging device as claimed in claim 7, wherein
the extraction unit performs camera shake correction of the photographed image based on the discrimination result of the discrimination unit, and,
when the object region is located at the edge of the valid photographed region, upon detecting the object region moving outward from the partial image of the imaging unit, the discrimination unit extracts the partial image so that the object region is included in the partial image, and outputs the partial image, whereas the discrimination unit aborts execution of the camera shake correction upon detecting the object region moving inward within the valid photographed image of the imaging unit.

9. A camera shake correction method comprising the steps of:
detecting movement of an imaging device, and outputting motion data representing the movement;
extracting a target object region from a photographed image obtained by an imaging unit in the imaging device; and
performing camera shake correction of the photographed image, the camera shake correction on the photographed image is performed based on a moving direction of the target object region in the photographed image wherein when the moving direction of the target object image is outward of the photographed image, the correction unit performs the camera shake correction but when the moving direction of the target object image is inward of the photographed image, the correction unit does not perform the camera shake correction.

10. The method as claimed in claim 9, wherein the performing camera shake correction includes aborting execution of the camera shake correction processing when the movement of the imaging device is not camera shake.

* * * * *